(12) United States Patent
Mityagin et al.

(10) Patent No.: US 9,641,488 B2
(45) Date of Patent: May 2, 2017

(54) ADVANCED SECURITY PROTOCOL FOR BROADCASTING AND SYNCHRONIZING SHARED FOLDERS OVER LOCAL AREA NETWORK

(71) Applicant: Dropbox, Inc., San Francisco, CA (US)

(72) Inventors: Anton Mityagin, San Francisco, CA (US); Dwayne Litzenberger, San Fransisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/193,316

(22) Filed: Feb. 28, 2014

(65) Prior Publication Data

US 2015/0249647 A1 Sep. 3, 2015

(51) Int. Cl.
| | |
|---|---|
| *H04L 9/32* | (2006.01) |
| *H04L 29/06* | (2006.01) |
| *H04L 9/08* | (2006.01) |
| *H04L 29/08* | (2006.01) |
| *G06F 17/00* | (2006.01) |

(52) U.S. Cl.
CPC ........ *H04L 63/0428* (2013.01); *H04L 9/0869* (2013.01); *H04L 63/10* (2013.01); *H04L 67/1095* (2013.01)

(58) Field of Classification Search
CPC  H04L 63/0435; H04L 63/0428; H04L 9/0869
USPC .................. 713/155, 168, 156, 171
See application file for complete search history.

(56) References Cited

U.S. PATENT DOCUMENTS

| | | | | |
|---|---|---|---|---|
| 5,966,714 A * | 10/1999 | Huang | ................. | G06Q 10/107 |
| 8,266,428 B2 * | 9/2012 | Kwon | ............... | H04L 29/12358 713/153 |
| 8,332,357 B1 * | 12/2012 | Chung | .............. | G06F 17/30174 707/634 |
| 2005/0100161 A1 * | 5/2005 | Husemann | ......... | G06Q 20/0855 380/200 |
| 2005/0187877 A1 * | 8/2005 | Tadayon | ................. | G06F 21/10 705/51 |
| 2005/0271210 A1 * | 12/2005 | Soppera | ................ | H04L 9/0836 380/277 |
| 2006/0026236 A1 * | 2/2006 | Scian | ................... | G06Q 10/107 709/206 |
| 2006/0104442 A1 * | 5/2006 | Han | ...................... | H04L 9/0825 380/44 |

(Continued)

*Primary Examiner* — Abu Sholeman
(74) *Attorney, Agent, or Firm* — Polsinelli PC

(57) ABSTRACT

A method, system, and manufacture for securely broadcasting shared folders from one client device to other client devices and synchronizing the shared folders over a local area network. A first client device, associated with a content management system, generates a secure identifier for a shared folder, using a shared secret key that is associated with the shared folder. The first client device announces the secure identifier over a local area network to other client devices on the local area network including a second client device. The first client device receives a synchronization request for the shared folder from the second client device. After authenticating, using the shared secret key, that the second client device has authorization to access the shared folder, the first client device synchronizes the shared folder with the second client device over the local area network.

20 Claims, 13 Drawing Sheets

(56) References Cited

U.S. PATENT DOCUMENTS

| | | | |
|---|---|---|---|
| 2006/0291660 A1* | 12/2006 | Gehrmann | H04L 63/045 380/277 |
| 2007/0005707 A1* | 1/2007 | Teodosiu | G06Q 10/107 709/206 |
| 2007/0162399 A1* | 7/2007 | Medvinsky | G06F 21/10 705/59 |
| 2007/0296805 A1* | 12/2007 | Tedenvall | H04N 7/17318 348/14.01 |
| 2008/0010242 A1* | 1/2008 | Jin | G06F 21/445 |
| 2008/0022089 A1* | 1/2008 | Leedom | H04L 63/068 713/156 |
| 2008/0049941 A1* | 2/2008 | Kim | H04W 12/04 380/278 |
| 2008/0066182 A1* | 3/2008 | Hickmott | H04L 9/3213 726/26 |
| 2008/0226073 A1* | 9/2008 | Hawkes | H04L 63/04 380/270 |
| 2008/0294557 A1* | 11/2008 | Ramani | G06Q 20/322 705/44 |
| 2008/0307522 A1* | 12/2008 | Shoji | G06F 3/0622 726/21 |
| 2009/0005032 A1* | 1/2009 | Lunati | G06F 17/3028 455/426.1 |
| 2009/0016537 A1* | 1/2009 | Ju | H04H 60/15 380/278 |
| 2009/0030974 A1* | 1/2009 | Boudreau | H04L 63/104 709/203 |
| 2009/0083132 A1* | 3/2009 | Doganaksoy | G06F 21/10 705/7.29 |
| 2009/0213245 A1* | 8/2009 | Harper | G11B 27/11 348/231.3 |
| 2009/0268909 A1* | 10/2009 | Girao | H04W 12/04 380/259 |
| 2009/0313254 A1* | 12/2009 | Mattox, Jr. | G06F 17/3028 |
| 2009/0327299 A1* | 12/2009 | Schwartz | G06F 17/30176 |
| 2010/0088515 A1* | 4/2010 | Nishimoto | H04N 7/1675 713/168 |
| 2010/0146115 A1* | 6/2010 | Bezos | H04L 67/06 709/225 |
| 2010/0202346 A1* | 8/2010 | Sitzes | H04W 84/18 370/328 |
| 2011/0072126 A1* | 3/2011 | Wujuan | G06F 17/302 709/224 |
| 2011/0083149 A1* | 4/2011 | Picucci | H04N 5/76 725/39 |
| 2011/0085526 A1* | 4/2011 | Joseph | H04M 1/72533 370/338 |
| 2011/0103589 A1* | 5/2011 | Tie | H04L 9/0825 380/282 |
| 2012/0011363 A1* | 1/2012 | Kim | G06Q 10/10 713/168 |
| 2012/0036549 A1* | 2/2012 | Patel | G06F 21/10 725/153 |
| 2012/0089696 A1* | 4/2012 | May | H04L 67/1095 709/213 |
| 2012/0166803 A1* | 6/2012 | Hu | H04L 63/10 713/171 |
| 2013/0007469 A1* | 1/2013 | Aratsu | G06F 21/53 713/190 |
| 2013/0024923 A1* | 1/2013 | Wallaja | G06Q 20/00 726/6 |
| 2013/0110936 A1* | 5/2013 | Miura | H04W 12/08 709/204 |
| 2013/0124649 A1* | 5/2013 | Triantos | G06Q 10/103 709/206 |
| 2013/0217333 A1* | 8/2013 | Sprigg | H04W 4/008 455/41.2 |
| 2013/0227292 A1* | 8/2013 | Suffling | H04L 63/061 713/171 |
| 2013/0262862 A1* | 10/2013 | Hartley | G06F 21/602 713/165 |
| 2013/0316727 A1* | 11/2013 | Edge | H04W 4/02 455/456.1 |
| 2013/0325952 A1* | 12/2013 | Draznin | H04N 21/4126 709/204 |
| 2014/0062857 A1* | 3/2014 | She | G06F 3/017 345/156 |
| 2014/0133656 A1* | 5/2014 | Wurster | H04L 9/0637 380/270 |
| 2014/0143542 A1* | 5/2014 | Chang | G06F 12/1408 713/165 |
| 2014/0157435 A1* | 6/2014 | Stamos | H04L 63/04 726/28 |
| 2014/0161251 A1* | 6/2014 | Yoshida | H04L 9/0825 380/44 |
| 2014/0344739 A1* | 11/2014 | Yoon | G06F 17/30165 715/769 |
| 2014/0370879 A1* | 12/2014 | Redding | H04W 4/001 455/419 |
| 2015/0121539 A1* | 4/2015 | Chu | H04N 21/4181 726/26 |
| 2015/0127937 A1* | 5/2015 | Ali | G06F 21/6218 713/165 |
| 2015/0227753 A1* | 8/2015 | Callaghan | G06F 21/6218 713/165 |
| 2016/0044122 A1* | 2/2016 | Sandholm | H04W 4/008 709/206 |

* cited by examiner

SHARED FOLDERS 300

| ns_id | ns_key | NAME | AUTHORIZED CLIENT DEVICE |
|---|---|---|---|
| 07 | CE | VACATION 2004 | $102_1$, $102_2$ |
| 0C | 82 | INBOX | $102_1$, $102_3$, $102_5$ |
| 1F | 46 | PROFILES | $102_4$ |
| 21 | 1E | MY SHARED FOLDER | $102_3$, $102_4$ |
| 4C | FF | WORKSPACE1 | |
| 53 | 8D | MY DOCUMENTS | $102_2$ |
| 63 | 4C | PHOTOS_LONDON | $102_1$, $102_2$ |
| 67 | 33 | MOVIE_SCPT14 | $102_3$, $102_4$ |
| 7E | CC | JENNY'S STUFF | $102_5$ |
| 8C | 31 | MY MUSIC | $102_1$, $102_2$, $102_3$, $102_5$ |
| 8F | 85 | UNTITLED1 | $102_4$ |
| 90 | EC | 87 GRACELAND | $102_4$, $102_5$ |
| 92 | C9 | DOWNLOAD | $102_1$ |
| C2 | 22 | BACKUP_APR2013 | $102_3$ |
| DE | 98 | OFFICE_REMOTE | $102_3$, $102_4$, $102_5$ |
| E3 | 76 | PHONE BACKUP | |
| F4 | A4 | DESIGN DEC | $102_1$ |

ANNOUNCEMENT MESSAGE FORMAT 500 protocol_version,port,expire_time,nonce,ns_list=[h1,h2,h3, ...]

*FIG. 5A*

SECURE NAMESPACE IDENTIFIER FORMAT 502 h[i]=PRF(ns_key[i],serialize(protocol_version,expire_time,nonce))

*FIG. 5B*

ANNOUNCEMENT MESSAGE 504

```
{
    "version":[2,0]
    "port":17509,
    "expire_time":'Fri,30 Dec 2013 10:19:30 GMT'
    "nonce":'3fe14c746cc34ea820e40065e8dp'
    "ns_list":['41b837104b091e8d',
'ff8a8fa26dbf1fe9','32ae83b79e86d56f9']
}
```

*FIG. 5C*

$602_1$ — SHARED FOLDERS

| | ns_id | ns_key |
|---|---|---|
| $606_1$ | 63 | 4C |
| $606_2$ | 0C | 82 |
| $606_3$ | F4 | A4 |
| $606_4$ | 07 | CE |
| $606_5$ | 92 | C9 |
| $606_6$ | 8C | 31 |

$604_1$ — DISCOVERED PEERS

| | peer_id | ns_id | CLIENT |
|---|---|---|---|
| $608_1$ | | 07 | $102_2$ |
| $608_2$ | | 63 | $102_2$ |
| $608_3$ | | 0C | $102_3$ |
| $608_4$ | | 8C | $102_2, 102_3$ |

FIG. 6A $602_2$ — SHARED FOLDERS

| | ns_id | ns_key | ns_sid |
|---|---|---|---|
| $606_7$ | 8C | 31 | 07 |
| $606_8$ | 53 | 8D | 7A |
| $606_9$ | 07 | CE | 0B |
| $606_{10}$ | 63 | 4C | C3 |

$604_2$ — DISCOVERED PEERS

| | peer_id | ns_id | CLIENT |
|---|---|---|---|
| $608_5$ | | 63 | $102_1$ |
| $608_6$ | | 07 | $102_1$ |
| $608_7$ | | 8C | $102_1, 102_3$ |

FIG. 6B $602_3$ — SHARED FOLDERS

| | ns_id | ns_key |
|---|---|---|
| $606_{11}$ | 67 | 33 |
| $606_{12}$ | 21 | 1E |
| $606_{13}$ | 0C | 82 |
| $606_{14}$ | DE | 98 |
| $606_{15}$ | 8C | 31 |
| $606_{16}$ | C2 | 22 |

$604_3$ — DISCOVERED PEERS

| | peer_id | ns_id | CLIENT |
|---|---|---|---|
| $608_8$ | | 0C | 1 |
| $608_9$ | | 8C | $102_1, 102_2$ |

FIG. 6C

PEER IDENTIFIER FORMAT peer_id=(protocol_version,expire_time,nonce,peer_sid)
peer_sid=PRF(ns_key[i],serialize(protocol_version,expire_time,nonce))

ADVANCED SECURITY PROTOCOL FOR BROADCASTING AND SYNCHRONIZING SHARED FOLDERS OVER LOCAL AREA NETWORK

TECHNICAL FIELD

The present technology pertains to content management systems, and more specifically pertains to a security protocol for broadcasting information about shared folders and synchronizing shared folder contents over a local area network.

BACKGROUND

An online synchronized content management system, such as Dropbox® from Dropbox Inc. of San Francisco, Calif., allows its users to store and synchronize data on a cloud-based storage and across multiple client devices. Thus, a user may upload a personal folder to the content management system, and then share the folder on multiple user devices by having duplicate copies of the folder on each of the devices. The instances of the shared folder, though may be residing on different devices, can be kept synchronized. In other words, through the process of synchronization, the contents of the shared folder on multiple client devices can be kept identical. Even the slightest modification made by the user to one of the instances of the folder can automatically be replicated in other instances of the folder in a matter of seconds.

However, data synchronization across multiple client devices has traditionally been handled by a central server such as the content management system. More specifically, a change in content of a shared folder on one client device would be first replicated in the instance of the folder stored on the central content management system. The central server would then synchronize the shared folder with every other client device. Although this method of data synchronization may be relatively straightforward and intuitive to implement, it has several drawbacks.

First, too much burden can be placed on the central distributor. In other words, since every single client device must rely on the content management system to perform the task of data distribution, the content management system must bear the brunt of the workload. Therefore, the content management may become overburdened to handle an excessive amount of data processing and an overwhelming amount of data transfers. Second, the stability and robustness of the system can be compromised. Since every data synchronization job needs to go through the central distributor, the entire system can be paralyzed if the central distributor suddenly becomes unavailable. Third, connecting to and communicating with the central distributor can be costly. Client devices often need to connect to the central server via a wide area network (WAN) such as the Internet. Wide area networks can be, in general, less reliable and of inferior performance than a local area network (LAN).

Accordingly, some content management systems, such as Dropbox®, allow their client devices to synchronize with each other, especially over a LAN. Synchronizing data over a LAN connection (also called a "LAN sync") may have several benefits over synchronizing through a central distributor. Due to the relatively smaller geographical area that a typical LAN occupies, a LAN generally offers better performance and reliability than a WAN. A LAN, in general, can also be more configurable and customizable. Moreover, communicating over a LAN may be more cost-effective because there is no need to pay additional bandwidth or subscription fees for Internet communication.

However, in order for a client device to synchronize with another client device over a LAN, the client device needs to know which other client devices may be available for communication on the local network and which shared folders may be available for synchronization on each of those client devices. In other words, clients may want to find other clients on the local network that share the same shared folders. One way to obtain such information is for each client device to broadcast the availability information for the shared folders. Thus, each client device would essentially announce to every other client device which folders are available for synchronizing. Sometimes each client device on the local network may announce its shared folders by broadcasting a list of the namespace identifiers (ns_id) corresponding to those shared folders. This can allow each client device on the network to assemble a full list of all the shared folders available on the local network.

However, broadcasting folder information in the clear may have drawbacks. The first concern is privacy. Particularly, a client device may discover those shared folders on the network that a user of the client device does not have permission to access. This may allow an attacker to track individual user accounts and learn which devices host the same shared folders as the attacker.

The second concern is the integrity of the broadcast messages. In particular, a malicious client device could collect the full list of ns_id's and rebroadcast the list in order to induce other client devices to connect to the malicious client device. The malicious actor may also be able to spoof a shared folder announcement by broadcasting a fake yet valid announcement message with an arbitrary set of namespace identifiers. This can allow the attacker to direct LAN synchronization traffic to the attacker-controlled machine. Once a connection is established through such deception, the malicious device may become a vector that enables additional attacks against the unsuspecting peers, such as mining data, tampering data, injecting malicious code, etc. Third, since a peer initiating a peer-to-peer (P2P) connection (i.e., client peer) does not authenticate the peer it is connecting to (i.e., server peer), an attacker-controlled server peer can see hashes of files requested by the other peers and can tell if the peers are requesting certain known files.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for broadcasting information about shared folders and synchronizing shared folder contents over a local area network. The security flaws inherent in the conventional method of broadcasting shared folder information in the clear can be remedied by using a more advanced security protocol. Such a protocol may enable client devices having shared folders to synchronize the folders with other client devices over a local area network without having to reach out to a content management system.

For each shared folder on a content management system, the content management system may generate a namespace identifier (ns_id) and name space key (ns_key) pair associated with the shared folder. The content management system may then distribute (ns_id, ns_key) pairs to those client devices that are authorized to access the corresponding shared folders. A client device that receives the (ns_id, ns_key) pairs may generate secure namespace identifiers (ns_sid), one for each shared folder that the client devices is hosting, by using the namespace keys associated with the folders. A secure namespace identifier can be generated by encrypting various input values. The input values may include a protocol version, an expiration time, a cryptographic nonce, a namespace key, and/or a namespace identifier. The input values can be encrypted using a pseudorandom family (PRF) that maps a set of input values to an output value that is randomly generated and practically irreversible.

The client device may send out an announcement message that contains an encrypted list of secure namespace identifiers that the device generated based on the namespace keys. The announcement message may also contain the protocol version, the expiration time, the cryptographic nonce, etc. The announcement message may be broadcast to more than one client device at once over a local area network. The announcement message may be received by one or more of the other client devices that are present on the same local network.

One such client device that receives the announcement message can use its own set of namespace keys to determine whether the announcing and receiving client devices have any shared folders in common. The receiving device may do this by generating its own set of secure namespace identifiers using the same encryption method and the same input values. Some of these input values may have been supplied by the announcing client device through the announcement message, while other input values, such as the namespace keys, may have been previously supplied by the content management system. By comparing the generated secure namespace identifiers and the received secure namespace identifiers and identifying any matching entries, the receiving client device can find out which namespace keys, and by extension which namespace identifiers, the announcing client device may be privy to. The receiving client device can associate the appropriate namespace identifiers with the announcing client device. Thus, by exchanging such announcement messages, every client device can discover and catalogue every shared folder available for synchronization on every other client device on the local area network.

Each announcement message may be uniquely generated by incorporating a non-repeating cryptographic nonce. In other words, every time a new announcement message is generated, a new and unique nonce value can be generated and used as one of the input values for encrypting the secure namespace identifiers. Additionally, each announcement message may be given an expiration time, by which time any subsequent synchronization request must be received. The expiration time can also be incorporated into the secure namespace identifiers.

Once the shared folders are discovered through announcement messages, a client device may attempt a LAN synchronization with another discovered peer device. The folder synchronization can be performed by establishing a secure connection such as a transport layer security (TLS) connection. The client device requesting synchronization may act as a client peer and the client device that receives the request may act as a server peer. The client peer can send a synchronization request for a particular shared folder to the server peer. More than one secure connection may be established to synchronize multiple shared folders, one connection for each folder. The synchronization request can be associated with and based on a specific announcement message. The synchronization request may contain a peer identifier (peer_id) based on a protocol version, an expiration time, a cryptographic nonce, and a secure peer identifier (peer_sid). The expiration time and the cryptographic nonce can be identical to those received through the announcement message, on which the synchronization request is based. The secure peer identifier may be generated by encrypting the namespace key that corresponds to the shared folder to be synchronized. The secure peer identifier may be generated by encrypting other additional input values as well, including a protocol version, an expiration time, a cryptographic nonce, etc.

When the server peer receives the synchronization request, the server peer may attempt to authenticate the client peer and its authorization to access the shared folder. Such authentication can be done using the namespace key associated with the shared folder. Specifically, the server peer may generate a set of secure peer identifier values for each of its shared folders and namespace keys. The authentication can be successful if a match is found between the set of generated secure peer identifiers and the secure peer identifier received through the synchronization request. After a successful authentication, the client peer and the server peer can finally exchange data blocks to synchronize the contents of the shared folder. The data blocks may be exchanged through a secure connection established using the folder's namespace key as the shared secret key. Alternatively, the secure peer identifier can be used as the shared secret key.

Integrity may be provided by a combination of the PRF and the expiration timestamp. The PRF can prevent anyone who is not a member of a shared folder from generating valid secure identifiers. Moreover, the timestamps can prevent one from rebroadcasting secure identifiers from unauthorized devices after the expiration time. Likewise, privacy may be provided via a combination of the PRF and the cryptographic nonce. It would be infeasible for anyone who did not possess the shared secret key to discern whether two secure identifiers corresponded to the same or different folders.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an exemplary list of shared folders on a content management system;

FIG. 5A shows an exemplary announcement message format;

FIG. 5B shows an exemplary secure namespace identifier format;

FIG. 5C shows an exemplary announcement message;

FIGS. 6A-6C show exemplary shared folders lists and exemplary discovered peers lists;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The disclosed technology addresses the need in the art for broadcasting information pertaining to shared folders and synchronizing the shared folders over a local area network.

Figure 1:
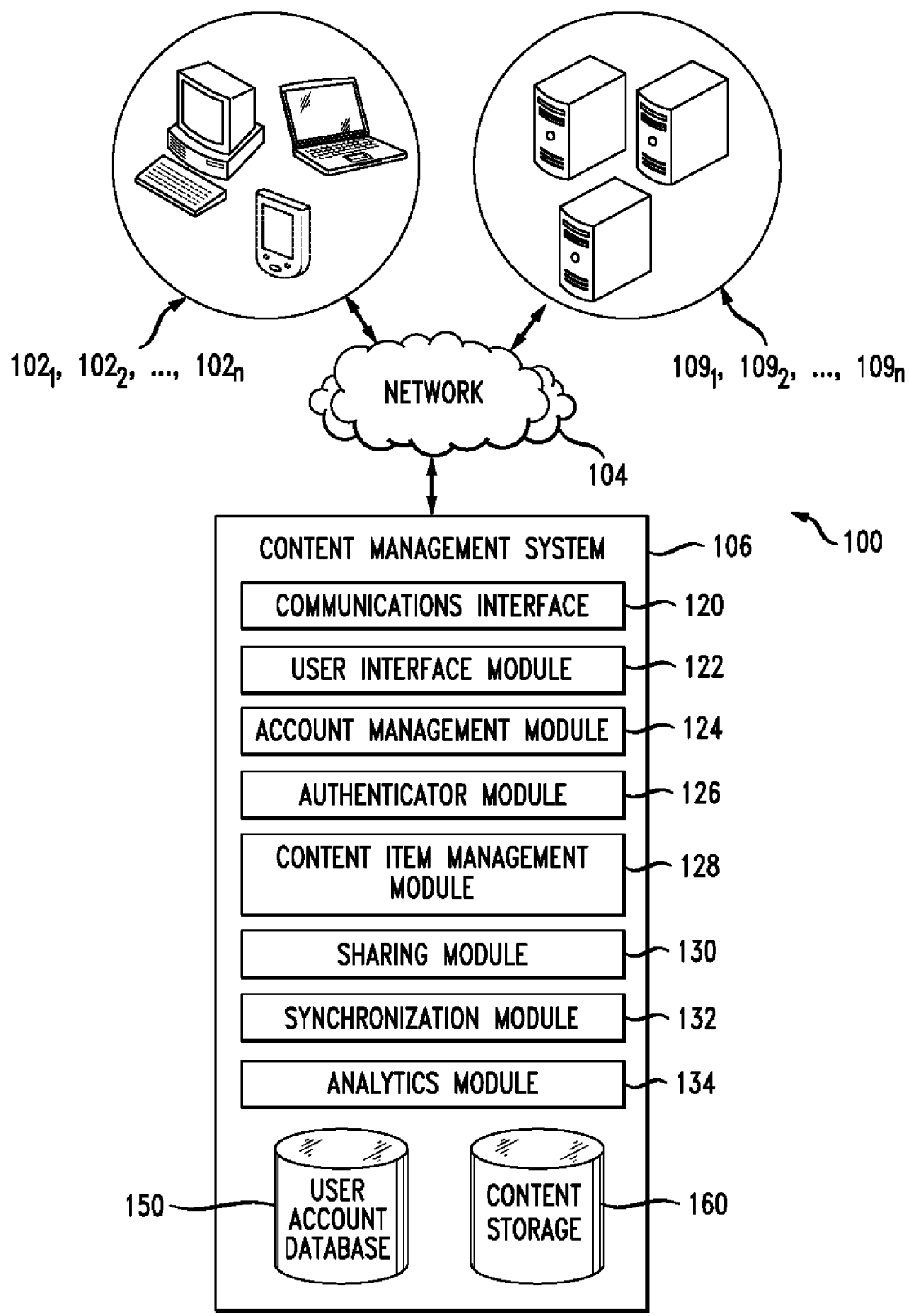
FIG. 1 shows an exemplary content management system configured to communicate with other devices through a network in accordance with the invention.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smartphones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can include content item management module 128, which may store, retrieve, catalog, manage, and keep track of various content items in content storage 160. Further, content item management module 128 may, in conjunction with account management module 124, keep track of which user account has access to which content items. Each content item may be given unique identifiers. Likewise, shared folders may be given unique namespace identifiers, also known as folder identifiers. For example, content item management module 128 may address each shared folder with an alphanumeric text string that uniquely identifies the respective shared folder.

Content management system 106 can also include authenticator module 126, which can verify user credentials, security tokens, API calls, specific client devices, and so forth, to ensure only authorized clients and users can access files. Authenticator module 126 may generate and issue namespace keys to content items and/or shared folders. The namespace keys, also known as shared secret keys, may function as a shared secret for the respective namespace. Accordingly, the namespace keys may be required to access those content items or shared folders. For example, a namespace key may consist of a Rivest-Shamir-Adleman ("RSA") key pair and/or a corresponding client certificate such as a self-signed X.509 certificate. Alternatively, a namespace key may simply be a secret string rather than an RSA key pair.

The namespace key, along with the corresponding namespace identifier, may be distributed, in a secure manner, to any client devices and/or user accounts that may have access to the respective content items or shared folders. The distributed namespace keys, in turn, may be used by the client devices and/or the user accounts to authenticate that they have been given privilege to access the respective content items or shared folders.

Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
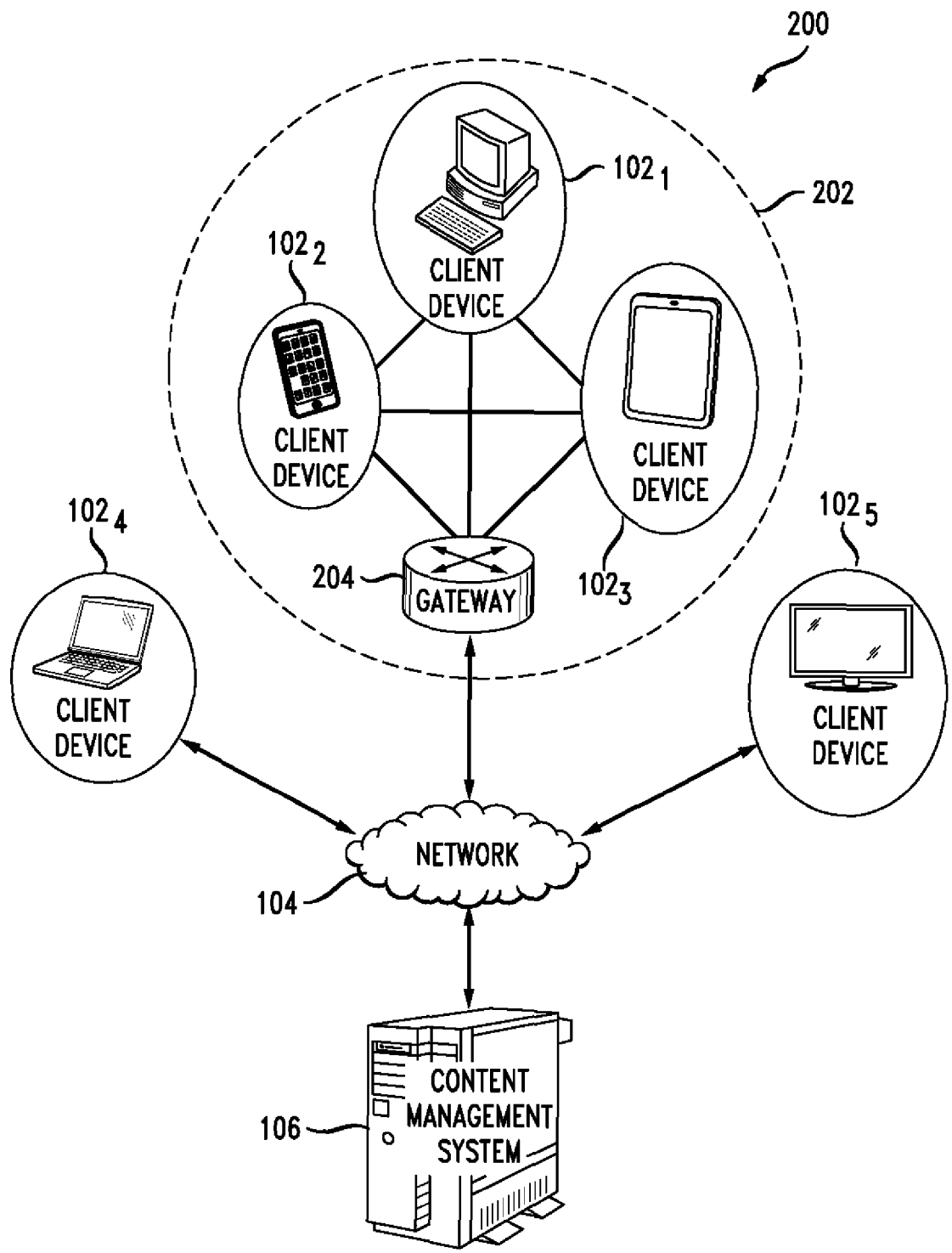
FIG. 2 shows an exemplary configuration of client devices in a LAN in relation to a content management system.

Having established the functionalities of various possible modules of content management system 206, we now turn to FIG. 2, which shows an exemplary configuration of client devices in a LAN in relation to a content management system. Network configuration 200 shows one possible way that various client devices 102 can be connected to each other and to content management system 106. Various client devices 102 may communicate with content management system 106 via network 104, which in this example is a wide area network. LAN 202 connects to network 104 through gateway 204. Some client devices $102_1$, $102_2$, $102_3$ may belong to the same local area network, which in this example is LAN 202. LAN 202 may operate on various technologies, protocols, and mediums such as Fast Ethernet, Gigabit Ethernet, Wi-Fi, power line communication, Multimedia over Coax Alliance ("MoCA"), etc. Client devices $102_1$, $102_2$, $102_3$ in LAN 202 may communicate with content management system 106 and/or other client devices via network 104.

Client devices 102 may contain shared folders, which may be associated with one or more user accounts. The contents of the shared folders can be synchronized across content management system 106 and/or various client devices 102. For example, if client device $102_2$ and client device $102_4$ each contain the shared folder named, "My Music," and the user adds a new audio file to the "My Music" folder on client device $102_2$, then a duplicate copy of the audio file will be created in the "My Music" folder on client device $102_4$ as well. Such synchronization can be done via content management system 106 and/or another client device. For example, client device $102_1$ may download a missing or updated file from content management system 106, but it can also download the file from client device $102_2$ if it has the needed file.

It may be advantageous for client devices 102 to synchronize content items and shared folders with another client device over LAN 202 instead of with a client device located outside LAN 202 or with content management system 106 via network 104. Because of the relatively shorter traveling distances for data, LANs, in general, offer better performance—higher throughput, lower error rate, etc.—than a typical wide area network such as the Internet. Communicating over LAN 202 can also be more cost-effective than communicating over a wide area network such as a wireless mobile data network (e.g., LTE, WiMax, HSDPA, EDGE, etc.), which often charges its subscribers by the amount of data being used. LAN 202 tends to be more configurable and customizable than WANs because LAN 202 is typically under full control of a local and/or private network administrator.

Therefore, content management system 106 may allow its client devices 102 to synchronize data amongst themselves in addition to offering the option of synchronizing with content management system 106 directly. For example, client device $102_1$, client device $102_2$, and client device $102_3$ may synchronize contents of their shared folders with one another over LAN 202 instead of having to communicate with other client devices or content management system 106 via network 104.

FIG. 3 shows an exemplary list of shared folders on a content management system. Shared folders list 300 can be generated and managed by content management system 106. Alternatively, shared folders list 300 can be stored, either in whole or in part, inside each of client devices 102. Namespace identifiers 302 (ns_id) can be used to uniquely identify each of the shared folders that are managed by content management system 106. Although namespace identifiers 302 are shown as 8-bit hexadecimal numbers in FIG. 3, namespace identifiers 302 may be of any value, number, alphanumeric character string, text, etc. of any lengths. For example, namespace identifiers 302 can be 10-digit numbers or hex-encoded 64-bit values. Namespace identifiers 302 typically may not change during the course of the lifetime of their corresponding shared folders. Even after a shared folder is no long in use because the folder is removed, deactivated, archived, destroyed, lost, etc., the namespace identifier associated with the folder may be kept from being reused for a different shared folder in order to prevent namespace collision.

Namespace keys 304 (ns_key) may be paired with namespace identifiers 302 to offer security to accessing content items contained in the shared folders. Namespace keys 304 can be secret strings, typically randomly generated and given out to certain user accounts and/or client devices 102 that are given access to the shared folders. Then, content management system 106 or other client devices 102 can verify the value of the namespace key to authenticate access/synchronization privilege. For example, when client device $102_1$ is given the privilege to access contents of a shared folder with a namespace identifier 0x07, then content management system may generate a corresponding namespace key (e.g., 0xCE) for the shared folder and distribute the namespace key to client device $102_1$ in a secure manner. The next time client device $102_1$ sends a synchronization request to content management system 106, content management system 106 can authenticate client device's $102_1$ access privilege by verifying the namespace key value that is provided by client device $102_1$. On the other hand, client device $102_3$, which may lack the namespace key for the shared folder, cannot access or synchronize the shared folder because it cannot successfully authenticate with content management system 106.

Alternatively, namespace keys 304 may contain more sophisticated security instruments such as a public-private key pair (e.g., RSA) or a client certificate (e.g., X.509 public key infrastructure). In such scenarios, the contents of the shared folders can be encrypted with a public key certified by a public key certificate. In order to access any contents in the shared folder, each client device $102_i$ may have to use the private key embedded in the given namespace key to decode any encrypted messages. Such namespace keys 304 can also be used for authentication purposes. For instance, content management system 106 or client devices 102 can verify another client device's access privilege to a certain shared folder by examining the value of the namespace key corresponding to the folder's namespace identifier.

Shared folders may have folder names 306. Folder names 306 are typically human-readable (e.g., "VACATION 2004," "JENNY'S STUFF," etc.) and created by a user as opposed to being randomly assigned by content management system 106. Unlike namespace identifiers 302, which are typically immutable, folder names 306 can be modified by a user. In some instances, content management system 106 may allow a shared folder to have multiple folder names for multiple instances of the shared folder. For instance, a user may synchronize the same shared folder on three of her client devices under three different folder names. In such an embodiment, folder names 306 can be used as a default folder name when creating an instance of a shared folder on client device $102_i$.

Shared folders list 300 may also identify authorized client devices 308 for the shared folders. Shared folders may be shared across one or more client devices or no client devices. For example, exemplary shared folders list 300 shows that the shared folder named "PHOTOS_LONDON" (ns_id=0x63) is being shared with two client devices—client device $102_1$ and client device $102_2$. The number of authorized client devices 308 can change (i.e., grow or shrink) over time. A user, for example, may choose to download and synchronize a folder on one client device and later decides to deauthorize the same client device so that the device can no longer synchronize the folder. Another shared folder may no longer be synchronized with any of the client devices but simply reside on content management system 106.

Figure 4:
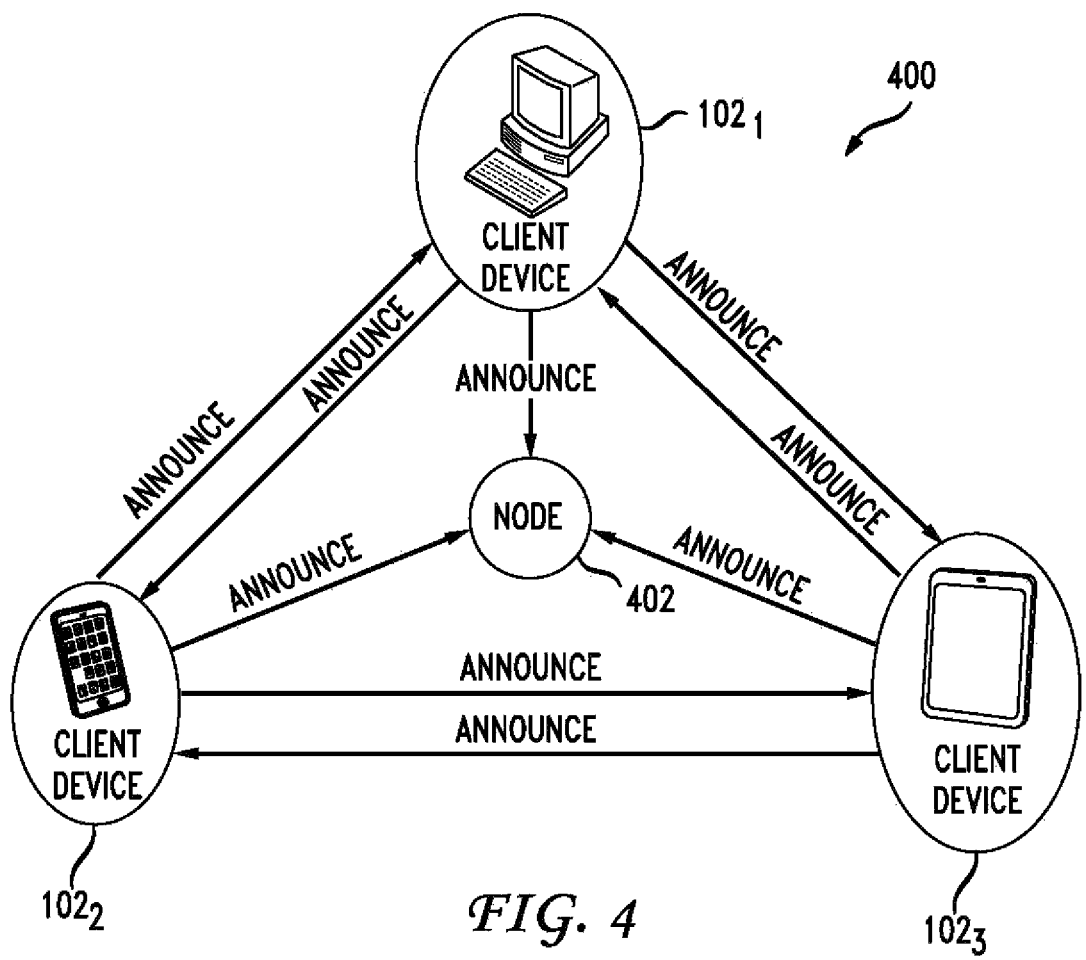
FIG. 4 shows example client devices broadcasting information over a local area network.

FIG. 4 shows example client devices broadcasting information over a local area network. Client device $102_1$, client device $102_2$, and client device $102_3$ may all be situated inside LAN 400, which in turn may be connected to a WAN such as the Internet. The client devices may each host shared folders that are synchronized on content management system 106. As discussed above, it may be advantageous for the client devices to synchronize some or all of their respective shared folders with each other over LAN 400 rather than contacting content management system 106 via a WAN such as the Internet. For example, both client device $102_2$ and client device $102_3$ may have instances of the same shared folder but the one on client device $102_2$ may be slightly outdated and out of sync while the shared folder on client device $102_3$ may be up to date. In such an example, rather than communicating with content management system 106, which can be relatively more costly, sluggish, and/or error-prone, client device $102_2$ can simply synchronize its shared folder with client device $102_3$, which already has identical copies of the content items belonging in the shared folder as those on content management system 106.

Client device $102_1$, client device $102_2$, and client device $102_3$ may each announce any information pertaining to their respective shared folders to the other client devices by broadcasting an announcement message out on to LAN 400. Broadcasting the announcement message can be performed by using a broadcast address (e.g., 255.255.255.255). As an example, client device $102_1$ can broadcast the announcement message to every network-attached host on LAN 400, including client device $102_2$, client device $102_3$, and even node 402, which may not be associated with content management system 106. Alternatively, instead of broadcasting the announcement message to every node on LAN 400, a client device may target specific nodes using specific network addresses. Moreover, a client device can make announcements on a regular basis to make its presence known to other devices and keep the message fresh and updated. For example, client device $102_1$ may broadcast announcement messages every 5 minutes. Every time there are any changes in the configuration of its shared folders (e.g., a new shared folder added, a shared folder removed, etc.), the latest announcement message sent out can reflect those changes. Additionally, an expiration time can be attached to each announcement message so that any subsequent synchronization request would have to be based on the latest announcement message containing the most relevant information. The expiration timestamp can prevent one from reusing or rebroadcasting the announcement message after the expiration time.

An announcement message, as will be discussed below in greater detail, may contain namespace identifiers or namespace keys for some or all of the shared folders that the transmitting client device has access to. The announcement message may also include other information such as a host identifier, a protocol version, a communication port, an expiration time, a cryptographic nonce, etc. In order to generate such an announcement message, the announcing client device may have to calculate the expiration time and randomly generate the cryptographic nonce. The announcement message may be encoded or encrypted in whole or in part to increase security. More specifically, the namespace keys and a host of other information can be encrypted using a specific cryptosystem to create a secure namespace identifier. The secure namespace identifier, also known as the secure identifier, may uniquely identify a shared folder without revealing the namespace identifier associated with the folder. For example, by encrypting the announcement message, the recipient of the message may not be able to recognize the namespace identifiers of the shared folders unless the receiving peer has an appropriate key such as a namespace key. However, the expiration time and the cryptographic nonce may also be broadcast in the clear so that any receiving client device may be able to use them to validate the message.

Once the receiving client device receives the announcement message, the device may initiate the validation process to find out which shared folders are available for synchronization on the announcing client device. The receiving peer may do this by replicating the encoding/encryption process using its own namespace keys. In other words, the receiving client device can use the identical cryptosystem, which the announcing client device used to create the announcement message, in order to determine whether there are any folders that are shared between the two client devices. If there are any commonly shared folders between the two devices, the receiving client device may make an association between the namespace identifiers for the commonly shared folders and the client device that sent the announcement message. Such information can be stored in a discovered peers list. For example, client device $102_1$ may update its discovered peers list every time it receives an announcement message from client device $102_2$ or client device $102_3$ in order to keep track of all the shared folders that the other client devices may have available for synchronization and any other accompanying data (e.g., protocol versions, expiration times, cryptographic nonces). Client device $102_1$ can later use the information contained in the discovered peers list to send sync requests to client device $102_2$ and/or client device $102_3$.

Client device $102_1$, client device $102_2$, and client device $102_3$ may each be associated with one user account or multiple user accounts. For instance, an announcement message can be broadcast from a client device associated with one user to a client device associated with another user. The discovered peers list may also include entries pertaining to multiple user accounts. For example, if Alice stores a shared folder named "Big Project 2004" on client device $102_1$ and Bob has an instance of the "Big Project 2004" folder on client device $102_2$, the two devices may still discover each other's instance of the shared folder as long as the they both have the namespace key that corresponds to the "Big Project 2004" folder. LAN synchronization can also be platform agnostic. For example, client device $102_1$ may run on a Windows® operating system, while client device $102_2$ runs on an iOS® mobile operating system and client device $102_3$ runs on an Android® mobile operating system.

FIG. 5A shows an exemplary announcement message format. When client devices 102 send out announcement messages to other client devices over a local area network, they may each have to agree to use a standard announcement message format for their messages. Announcement message format may include, among other things, a protocol version, a port number, an expiration time, a cryptographic nonce, and a list of namespace identifiers. As announcement message format 500 may evolve over time to include more or less items, the protocol version number (protocol_version) indicates which iteration of the protocol is currently being used for the message. If the message's protocol version does not match with the protocol version that is used by the receiving peer, the receiving peer may choose to process or discard the message. The port number (port) may indicate, for example, which transmission control protocol (TCP) port the announcing client device will be listening on for connections. When the receiving client device attempts to establish a connection with the announcing client device, for example to send a sync request, the receiving client device may use the port number indicated in the announcement message to do so.

An expiration time (expire_time) may indicate when other peers should stop accepting the announcement. In addition, the expiration time may indicate an acceptable window of time in which a receiving client device may try to establish a connection with the announcing client device. The expiration time can be an absolute timestamp. For example, client $102_1$ may broadcast an announcement message at 2005-10-30 T 10:45 UTC with expire_time set to 2005-10-30 T 22:45 UTC. In this example, if another client device such as client device $102_3$ wants to respond to the announcement and request synchronization for a shared folder, client device $102_3$ may be required to transmit the request to client device $102_1$ before 2005-10-30 T 22:45 UTC. Once the expiration time is passed, any attempt to establish a connection with client $102_1$ may fail unless the request is based on a newer unexpired announcement message. The expiration time can be tied to a cryptographic nonce, which will be discussed below in greater detail. For example, the expiration time can indicate the period of time in which the associated nonce will be effective. In such a case, once the expiration time is passed a new nonce can be generated and issued by the announcing device.

The expiration time may be computed using the time reported by a server such as content management system 106. For example, each client device may keep a "server time" object (e.g., (server_time, local_monotonic_time)) and update the object on every hypertext transfer protocol (HTTP) response from the server such as content management system 106. Using an absolute time system synchronized with a server can free the client devices from having to deal with the client devices' own real-time clocks or time zone settings. Alternatively, client devices 102 belonging on the same local area network may synchronize their internal clocks with each other's in advance. Moreover, a client device can have a default time expiration period (e.g., 12 hours), from which an expiration time can be calculated each time an announcement message is sent out. Decreasing the default time period may tend to increase security but may have a side effect of an increased cost (i.e., CPU cycles, etc.).

The cryptographic nonce (nonce) can be defined as a randomly generated number used only once in a cryptographic communication. In the context of this disclosure, each time a client device sends out an announcement message, the client device may randomly generate a new nonce that is used and broadcast only once and never repeated again. Incorporating a nonce into secure namespace identifiers can increase security because it can guarantee that the resulting secure namespace identifiers will be different every time a different cryptographic nonce is used. Incorporating an expiration time into the secure namespace identifiers can achieve a similar effect although the expiration time can be more easily guessed than a randomly generated nonce. Hence, using the nonce can help prevent a malicious eavesdropper from capturing the announcement message or the subsequent synchronization request and using it to initiate a replay attack. A nonce can be of any length, but a nonce with a bigger size will generally result in better security. For example, a cryptographic nonce can be a hex-encoded 128-bit value. A longer nonce value can also be more costly to generate and incorporate into a secure namespace identifier because it may require more processing power and/or time.

Announcement message format 500 can also include a list of one or more namespace identifiers. Instead of plaintext namespace identifiers, an announcement message can include a list of secure namespace identifiers for better security. Similar to a namespace identifier, a secure namespace identifier can uniquely identify a shared folder. The secure namespace identifier can be generated based on various input values such as a namespace identifier, a namespace key, a protocol version, an indication of an expiration time, a cryptographic nonce, etc. Since a client device can host multiple shared folders, it may also generate multiple secure namespace identifiers, one for each shared folder. The announcement message can contain multiple secure namespace identifiers in a serialized form. For instance, the secure namespace identifiers can be stored in an announcement message using one or more of data serialization formats, such as Comma-Separated Values (CSV), Extensible Markup Language (XML), JavaScript Object Notation (JSON), etc. Alternatively, instead of serializing all of the secure namespace identifiers into one announcement message, a client device may send out the secure namespace identifiers over multiple announcement messages. For example, if a client device is hosting six shared folders, it may send out one announcement message containing information about all six folders, three announcement messages each containing two secure namespace identifiers, or six announcement messages each containing a single secure namespace identifier. Other combinations are also possible. Once an announcement message is sent to another client device, the receiving client device can generate its own secure namespace identifiers using the set of information that is available to that device to determine whether the two devices have any shared folders in common.

Announcement message format 500 may include any other information that may be beneficial to the receiving peers to know. For example, an announcement message may include flags, each associated with a shared folder that can indicate whether there have been any changes in the shared folders since the last announcement or synchronization. Such flags can help minimize the need to establish potentially costly secure connections to exchange data for synchronization. As an example, if a user adds some new files to a particular shared folder on one of her client devices, the next time that client device sends out an announcement message, the flag associated with the modified shared folder can be raised (e.g., changing a bit from 0 to 1) so that other peers can initiate synchronization to update the folder.

FIG. 5B shows an exemplary secure namespace identifier format. For each shared folder i and its associated namespace key ns_key[i], a secure namespace identifier h[i] may be generated. The secure namespace identifier can be a message authentication code (MAC), which protects the announcement message's data integrity and authenticity. In this exemplary secure namespace identifier format 502 (ns_sid), a pseudorandom function family (PRF) is used to convert a set of input values (i.e., ns_key[i], protocol_version, expire_time, and nonce) into a randomly chosen but consistent value (i.e., h[i]). A PRF can be defined as a collection of functions that emulate a random oracle so that, in theory, every unique query will be mapped to a random response chosen uniformly from the output domain. For example, a PRF can be a keyed-hash message authentication code such as HMAC-SHA-256 truncated to the least significant 64 bits. The mapping is fixed, which means that a set of input values that goes through a PRF transformation will always consistently result in the same output value. In other words, the receiving client device should be able to arrive at the identical h[i] value as long as the receiving client device uses the same PRF and the same set of input values when computing the secure namespace identifier. A secure namespace identifier can ensure data integrity because a PRF is practically irreversible and it is extremely difficult for a malicious actor to tamper with the output data. It can also ensure authenticity of the input values because only the client device that has access to the appropriate input values, such as ns_key, may generate the correct secure namespace identifier.

Although the exemplary secure namespace identifier format is presented as a PRF function, any other suitable algorithm may be used to generate a secure namespace identifier as long as the given algorithm can convert any given set of input values (i.e., ns_key[i], protocol_version, expire_time, nonce, etc.) into a fixed secure namespace identifier value, and it is practically infeasible to extract any of the constituent input values from the resulting secure namespace identifier. In addition, a single bit change in the input values would ideally result in a many-bit change in the output value so that an attacker may be prevented from detecting even a small change in the input values. Such an algorithm can be a hash function.

Secure namespace identifier format 502 may also consist of a different set of input values than what is shown in FIG. 5B. In general, including some data as part of the input values can guarantee that a different secure namespace identifier will be generated every time there is a change in that data. For instance, having a randomly generated one-time use cryptographic nonce as an input value can guarantee that every announcement message's secure namespace identifier will be unique. Similarly, by including the expiration time in the input, the secure namespace identifier will change every time the expiration time changes. Some input values shown in FIG. 5B may be omitted. Other input values not shown in FIG. 5B may be added. For example, secure namespace identifier format 502 may include a namespace identifier (ns_id) as an input value. In another example, expire_time or nonce can be omitted depending on the needs and processing capacities of the client devices. As shown in FIG. 5B, some of the input values (e.g., protocol_version, expire_time, nonce, etc.) can be serialized using a data serialization method such as CSV, XML, JSON, etc. A secure namespace identifier can be of any length or size. For example, h[i] can be a hex-encoded 64-bit value. Using a longer secure namespace identifier may generally result in longer processing time but offer better security.

FIG. 5C shows an exemplary announcement message, generated according to the example announcement message format of FIG. 5A and the example secure namespace identifier format of FIG. 5B. The constituent entries of announcement message 404 can be serialized using, for example, CSV, XML, JSON, etc. In this example, "version" indicates the protocol version that is being used to create this exemplary announcement message 404. The item "port" may indicate on which port number (e.g., TCP, UDP, etc.) the announcing client device will be listening for subsequent communication requests. The item "expire_time" indicates the time by which the responding peer must make the request to the announcing peer. The item "nonce" can be a cryptographic nonce, which is randomly generated specifically for this announcement message and never to be reused again. Although the exemplary announcement message 404 is shown to have a hex-encoded 128-bit nonce, the cryptographic nonce can be of a different size. The item "ns_list" may contain a serialized list of namespace identifiers (ns_id) or secure namespace identifiers (ns_sid), each representing a shared folder to which the announcing peer has access. Although the secure namespace identifiers shown in FIG. 5C are hex-encoded 64-bit values, they can be of a different size.

The list of secured namespace identifiers can be "padded" to prevent a timing attack. In other words, if the number of shared folders to be announced is smaller than the maximum list size (e.g., 128), the remaining fields may be padded with randomly generated faux identifiers to hide the number of available shared folders from the view of an unauthorized user/device. For example, an unauthorized eavesdropper may be able to figure out the number of ns_sid's that are contained in a given announcement message by the size of the message (even though the eavesdropper may not be able to figure out exactly which folders are being shared). However, if the announcement messages are "padded" and therefore always have the same size, it becomes extremely difficult for the eavesdropper to know how many shared folders are being announced.

Although the list of secure namespace identifiers may be encrypted with a PRF in this example, other data entries such as version, port, expire_time, and nonce can be broadcast in the clear. Announcing such data in an unencrypted plaintext form can be useful especially when the data was also used as input values for encrypting the secure namespace identifiers because the receiving client device will need the data to generate its own set of secure namespace identifiers for authentication.

FIGS. 6A-6C show exemplary shared folders lists and exemplary discovered peers lists based on the exemplary list of shared folders of FIG. 3. The exemplary lists of FIG. 6A may be maintained by a client device on a local area network, such as client device $102_1$ of FIG. 2. Similarly, the exemplary lists of FIG. 6B may be maintained by another client device on the same local area network, such as client device $102_2$ of FIG. 2. The exemplary lists of FIG. 6C may be likewise maintained by yet another client device on the same local area network, such as client device $102_3$ of FIG. 2. Shared folders lists $602_1$, $602_2$, $602_3$ (collectively "602") each contain information about the shared folders available for sync on the respective client devices. In particular, shared folders lists 602 may include namespace identifiers (ns_id), namespace keys (ns_key), and secure namespace identifiers (ns_sid) for each of the shared folders available on respective client devices. The secure namespace identifiers may be periodically updated because they may change over time due to refreshed expiration time or nonce values. Discovered peers lists $604_1$, $604_2$, $604_3$ (collectively "604") each contain information about any peers (i.e., client devices) that have commonly shared folders. Discovered peers lists 604 can be generated and updated at each client device when the device receives announcement messages from other client devices. Discovered peers lists 604 may contain additional information necessary to establish connections with the discovered peers, such as peer identifiers (peer_id), namespace identifiers (ns_id), etc. Discovered peers lists 604 may also indicate which client device hosts the individual shared folders. Although ns_id, ns_key, and ns_sid values are shown as 8-bit hexadecimal values in these exemplary lists, they can be of any size.

In this example, shared folders list $602_1$ and discovered peers list $604_1$ of FIG. 6A may be kept and managed by client device $102_1$ of FIG. 3. Client device $102_1$ currently hosts six example shared folders synchronized on content management system 106. For every shared folder that client device $102_1$ is hosting, the device has received a namespace identifier and namespace key pair from content management system 106. The namespace identifiers, which can uniquely identify each of the shared folders, are used to reference, access, and manage the shared folders. The namespace keys can be pre-shared keys (PSK) or shared secret keys that are generated by a server such as content management system 106 and distributed only to those client devices that have access to the corresponding shared folders. Therefore, a namespace key can be used to authenticate that a client device has proper access privilege to the corresponding shared folder. The shared folders on client device $102_1$ are represented by shared folders list entries $606_1$, $606_2$, ..., $606_6$. For example, shared folders list entry $606_2$ indicates that client device $102_1$ is hosting an instance of a shared folder with the namespace identifier 0x0C and that its namespace key is 0x82.

Client device $102_1$ can broadcast announcement messages to notify other client devices residing on the LAN of the identities of the shared folders that client device $102_1$ is hosting. However, in order to hide those identities from an unauthorized eavesdropper, client device $102_1$ can first generate secure namespace identifiers based on the namespace identifiers, namespace keys, and/or other data such as an expiration time and a cryptographic nonce. The eavesdropper cannot identify the shared folders unless he can also recreate the secure namespace identifiers with the appropriate input values (e.g., namespace keys, etc.).

Additionally, each client device can maintain a separate or related list (not shown in FIGS. 6A-6C) of all the announcement messages that they may broadcast. Such a list may be necessary to keep track of all the announcements that are made and to authenticate any incoming synchronization requests based on those announcement messages. For example, when client $102_1$ sends out an announcement message, client $102_1$ may record and store any relevant information with regards to that message, such as the protocol version used, the announcement time, the expiration time, the nonce value, the secure namespace identifiers generated, etc. When client device $102_1$ receives a sync request from client device $102_2$ in response to the previously broadcast announcement message, client device $102_1$ can authenticate client device $102_2$'s request by referring to the stored announcement information.

With discovered peers list $604_1$, client device $102_1$ can keep track of the shared folders that are available for synchronization on the local network. Client device $102_1$ can build up and update the list using the announcement messages that it may receive from other client devices such as client device $102_2$ and client device $102_3$. In particular, after client device $102_1$ receives an announcement message from another client device (e.g., client device $102_2$), client device $102_1$ can decode the message, generate its own set of secure namespace identifiers using the namespace keys (kept by client device 1020, the expiration time (supplied by client device $102_2$), the cryptographic nonce (supplied by client device $102_2$), etc., and compare the generated secure namespace identifiers with the received secure namespace identifiers to determine which shared folders may be available. Therefore, discovered peers list $604_1$ may only contain information about other client devices' shared folders that client device $102_1$ also has access to (i.e., commonly shared folders). For example, client device's $102_1$ discovered peers list $604_1$ could not have an entry for the shared folder with namespace identifier 0x53 (similar to shared folders list entry $506_8$ of client device $102_2$) because client device $102_1$ does not have access to the corresponding namespace key (i.e., 0x8D).

Discovered peers list entries $508_1, \ldots, 805_4$ may contain peer identifiers (peer_id), namespace identifiers (ns_id), originating client devices, etc. Discovered peers list entries $508_1, \ldots, 805_4$ may also contain other information such as namespace keys, protocol versions, expiration times, and cryptographic nonces. In this example, client device $102_1$ is shown to have four shared folders in common with the other client devices on the local network. For example, discovered peers list entry $608_1$ indicates that the shared folder with ns_id=0x07 can be synchronized with client device $102_2$, and discovered peers list entry $608_4$ indicates that the shared folder with ns_id=0x8C can be synchronized with either client device $102_2$ or client device $102_3$. Peer identifiers can be used to authenticate client device $102_1$ and establish a connection with the corresponding client device. Although the entries for the peer identifiers are not shown in exemplary discovered peers lists 604, each entry may include such information as a protocol version, an expiration time, a nonce, etc. Additionally, although the exemplary discovered peers lists 604 show one row of data entry per folder, the lists can be organized in such a way that each instance of the shared folder may have its own entry. For example, discovered peers list entry $608_4$ can be split up into two rows, one for client device $102_2$ and another for client device $102_3$ so that each instance of the shared folder can be linked to a unique peer identifier.

Shared folders list $602_2$ and discovered peers list $604_1$ of FIG. 6B may be kept and managed by client device $102_2$ of FIG. 3. The way client device $102_2$ may generate and maintain the two lists may be largely similar to the way that client device $102_1$ generates and maintains shared folders list $602_1$ and discovered peers list $604_1$. Therefore, many of the concepts and ideas discussed above regarding shared folders list $602_1$ and discovered peers list $604_1$ also apply to shared folders list $602_2$ and discovered peers list $604_2$. FIG. 6B shows that, in this example, client device $102_2$ currently hosts four shared folders synchronized on content management system 106. For example, shared folders list entry $606_{10}$ indicates that client device $102_2$ is hosting an instance of a shared folder with the namespace identifier 0x63 and that its namespace key is 0x4C.

With discovered peers list $604_2$, client device $102_2$ can keep track of the shared folders that are available for synchronization on the local network. For example, discovered peers list $604_2$ shows that client device $102_2$ has three commonly shared folders with client device $102_1$ and one commonly shared folder with client device $102_3$.

Likewise, shared folders list $602_3$ and discovered peers list $604_3$ of FIG. 6C may be kept and managed by client device $102_3$ of FIG. 3. The way client device $102_3$ may generate and maintain the two lists may be, for the most part, similar to the way that client device $102_1$ generates and maintains shared folders list $602_1$ and discovered peers list $604_1$. Therefore, many of the concepts and ideas discussed above regarding shared folders list $602_1$ and discovered peers list $604_1$ may also apply to shared folders list $602_3$ and discovered peers list $604_3$. FIG. 6C shows that, in this example, client device $102_3$ currently hosts six shared folders synchronized on content management system 106. For example, shared folders list entry $506_{13}$ indicates that client device $102_3$ is hosting an instance of a shared folder with the namespace identifier 0x0C and that its namespace key is 0x82.

With discovered peers list $604_3$, client device $102_3$ can keep track of the shared folders that are available for synchronization on the LAN. For example, discovered peers list $604_3$ shows that client device $102_3$ has two commonly shared folders with client device $102_1$ and one commonly shared folder with client device $102_2$. Discovered peers list $604_3$ may be constantly updated as client device $102_3$ continues to receive new announcement messages from the other client devices over the LAN.

Figure 7:
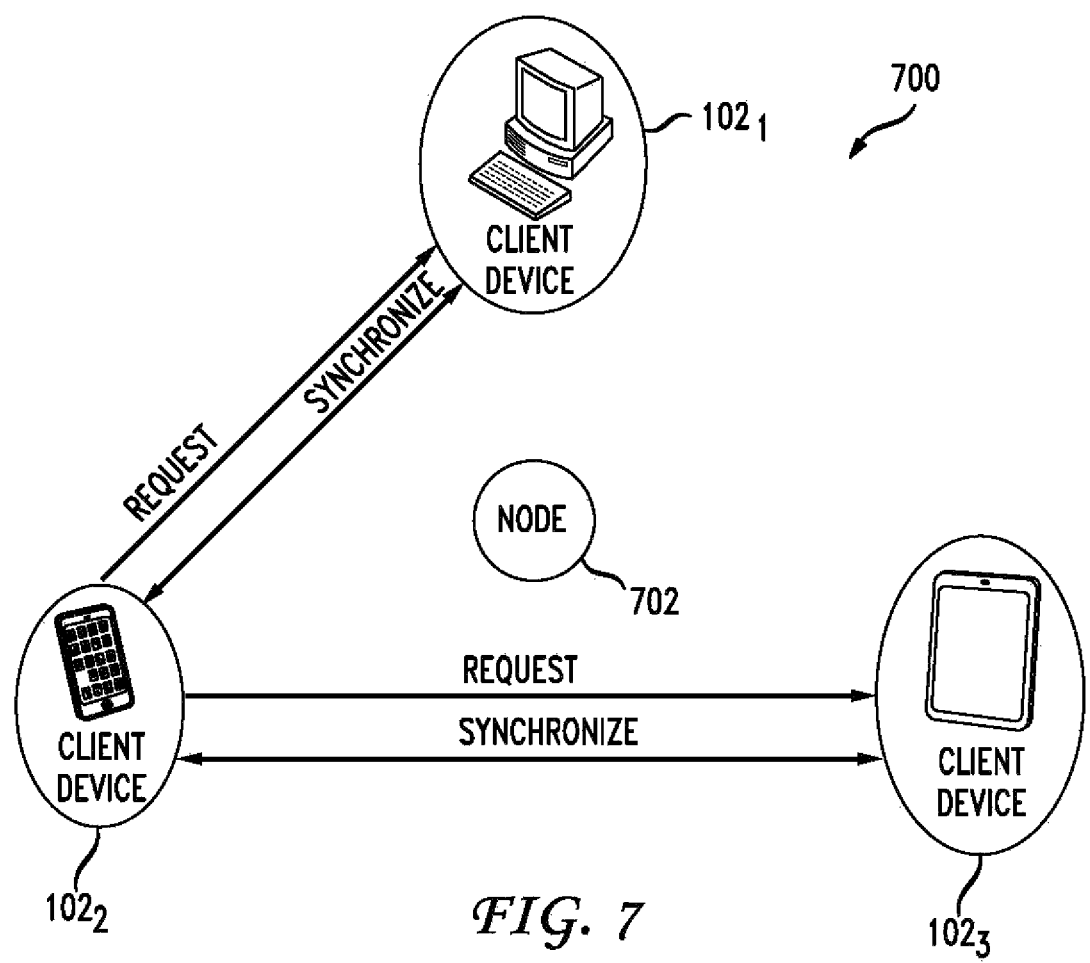
FIG. 7 shows example client devices synchronizing shared folders over a LAN.

FIG. 7 shows example client devices that are synchronizing shared folders over a local area network. Client devices 102 may be connected to each other through LAN 700, and they may host instances of various shared folders. Client devices 102 may have already discovered each other and any shared folders they may have in common. In addition, client devices 102 may keep track of various information related to the shared folders through lists such as shared folders lists 602 and discovered peers lists 604 of FIGS. 6A-6C. Client devices 102 may send synchronization requests to each other to establish a connection and initiate synchronization. The connection can be a secure connection, such as a transport layer security (TLS) connection, running a peer-to-peer (P2P) protocol. In this regard, the communicating client devices may be considered peers. The client device that requests synchronization can be a TLS client and the client device that receives the request can be a TLS server.

Such requests can be sent out on a regular basis to keep the data up to date. For example, each client device can send out sync requests every two minutes. In another example, sync requests can be sent out every time a new announcement message is received. Sync requests are typically sent in response to an announcement message, which may contain the information necessary to generate and send an appropriate sync request, such as the protocol version, the expiration time, the cryptographic nonce, etc. In addition, unlike an announcement message, which may contain a list of secure namespace identifiers for multiple shared folders, a synchronization request is typically sent out on a per-folder basis. In other words, in order to synchronize five shared folders, five separate sync requests may be sent out. Sync requests are also typically not broadcast to multiple network hosts but are targeted to specific client devices.

The connection establishment process will now be discussed in the context of client device $102_2$ making sync requests and synchronizing its shared folders with client device $102_1$. Client device $102_2$ may first generate a peer identifier (peer_id) value for a shared folder that it is trying to synchronize. Peer identifiers can contain the necessary information required to establish a secure connection with another client device that has one or more shared folders in common. For example, peer_id may be generated based on a protocol version used (protocol_version), an expiration time of the original announcement message (expire_time), a cryptographic nonce (nonce) that was included in the original announcement message, a secure peer identifier (peer_sid) for the shared folder to be synchronized, etc. Secure peer identifiers are generated in a similar fashion as secure namespace identifiers, for example, by using a PRF. However, a slightly different set of input values may be used to prevent replay attacks by an unauthorized eavesdropper. For instance, client device $102_2$ can generate a peer_sid using the same expire_time, nonce, and ns_key values, but a different protocol_version value.

Once peer_id is generated, client device $102_2$ sends a sync request to client device $102_1$ by trying to initiate a secure connection. For example, client device $102_2$ can try to establish a transport layer security pre-shared key (TLS-PSK) connection to client device $102_1$ using peer_id as client device's $102_2$ PSK identity. For example, the secure connection can be based on a TLS_PSK_WITH_AES_256_CBC_SHA ciphersuite. Other TLS ciphersuites may also be used including the elliptic curve Diffie-Hellman (ECDH)-based ciphersuites that provide forward secrecy. The sync request may be sent to the port number that was specified in the corresponding announcement message.

After client device $102_1$ receives the sync request message, client device $102_1$ can decode the peer_id value and verify whether the expiration time has passed. For example, client device $102_1$ may determine whether current_time<expire_time. If the expiration time has passed (i.e., current_time>expire_time), then client device $102_1$ may drop the connection at this point. Client device $102_1$ may also compare the received nonce value with the one that was used in generating the announcement messages on which the request is based. If the two nonce values do not match, client device $102_1$ may also drop the connection.

In addition, in order to prevent an unauthorized eavesdropper from capturing the request data and waging a replay attack on client device $102_1$, client device $102_1$ may choose to honor only the very first sync request sent in response to its announcement message. Any subsequent sync requests based on the same announcement message (i.e., the same expiration time and/or nonce) can be rejected. In such an embodiment, only one sync request per requesting client device may be allowed in response to each announcement message. For example, to an announcement message that was broadcast by client device $102_2$ at 13:00 with the expiration time of 14:00, client device $102_1$ and client device $102_3$ may each be allowed to respond with one sync request at or before 14:00, but neither devices may respond more than once to client device $102_1$. Alternatively, the relevant security policy may allow more than one but limited number of sync requests (e.g., two or three requests) per requesting client device per announcement message.

Client device $102_1$ may validate client device's $102_2$ identity by iterating over all available ns_key values of client device $102_1$ and attempting to verify client device's $102_2$ peer_sid value against those ns_key values. The verification can be performed by generating client device's $102_1$ own set of peer_sid values using the ns_key values, and comparing the generated peer_sid values with the peer_sid value that client device $102_1$ received from client device $102_2$. If a match is found between the received peer_sid value and one of the generated peer_sid values, their corresponding ns_id value can be inferred by referencing client device's $102_1$ (ns_id, ns_key) pairing information. Regardless of whether a matching ns_id is found, client device $102_1$ can perform computations for all available namespace keys in order to prevent a timing attack by an unauthorized eavesdropper.

If the validation succeeds, client device $102_1$ can use the identified ns_key as a shared secret key for establishing a secure connection such as a TLS-PSK connection with client device $102_2$. If the validation fails, client device $102_1$ may drop the connection and reject the request. Alternatively, in order to discourage timing attacks by an unauthorized eavesdropper, client device $102_1$ may still attempt to establish the secure connection with client device $102_2$ by using a randomly generated bogus key, which will result in a connection failure. Doing this can make an unsuccessful request virtually indistinguishable from a successful one as far as timing is considered because both cases will result in similar response times. Moreover, the bogus key may be generated on startup prior to any connection establishment operations and regardless of a presence of a key match because a random key generation operation can introduce a measurable time delay.

Once a secure connection is successfully established between the two client devices, they may exchange data packets to synchronize the shared folder. The data exchange can happen over LAN 700, which may offer better data transfer performance over a WAN such as the Internet. For example, a newly added file on one client device can be duplicated on the other client device, a modification to a file on one client device can be applied to the corresponding file on the other client device, and a file removed from one client device can be removed from the other client device. If there are any conflicts (e.g., a file is modified on both client devices between synchronization sessions), they can be dealt with according to predetermined conflict resolution policies or user preferences. The synchronization can happen in both directions.

After a synchronization session for a shared folder is completed between client device $102_2$ and client device $102_1$, client device $102_2$ may initiate synchronization for additional shared folders with client device $102_1$, or send new requests to other client devices such as client device $102_3$. Client device $102_1$, client device $102_2$, and client device $102_3$ may be each associated with one user account or multiple user accounts. Folder synchronization may occur between two client devices associated with two different user accounts. For example, Alice may synchronize her shared folder "Big Project 2004" on client device $102_1$ with Bob's shared folder "Big Project 2004" on client device $102_2$, provided that the identical namespace identifiers and namespace keys are stored on the two devices. In addition, LAN synchronizing capability does not preclude the option of synchronizing with a central content management system.

Thus, client devices $102_1$, $102_2$, $102_3$ may still communicate with the content management system and synchronize data when necessary.

Figure 8:
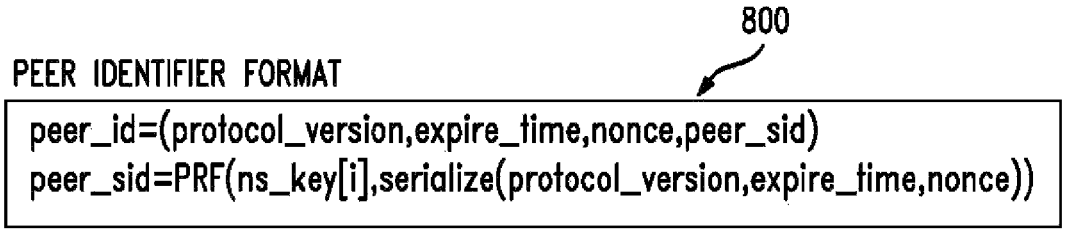
FIG. 8 shows an exemplary peer identifier format.

FIG. 8 shows an exemplary peer identifier format. A peer identifier (peer_id) can include, for example, a protocol version (protocol_version), an expiration time (expire_time), a cryptographic nonce (nonce), a secure peer identifier (peer_sid), and any other pertinent information that may be useful in establishing a secure connection and synchronizing data such as a data block number. A peer identifier is typically generated in response to a specific announcement message. Thus, many of the data elements that were included in the announcement message may be used as the bases for generating the peer identifier. The data fields contained in the peer identifier (i.e., protocol_version, expire_time, nonce, peer_sid, etc.) can be serialized using a suitable data serialization method such as XML, JSON, etc.

The protocol_version value may pertain to the version of the protocol being used in the sync request, which may not necessarily be the same as the protocol version that was used to send and receive announcement messages. Using a different protocol version number than the one used for broadcasting messages can be an effective deterrent against a replay attack, in which a secure namespace identifier may be captured by an unauthorized eavesdropper and then reused to send a sync request. The expiration time is generally the same as the one that was contained in the announcement message. The expiration can be an absolute timestamp based on a server time. The cryptographic nonce is generally also based on the nonce that was received through the announcement message. Whereas an announcement message may contain a list of one or more secure namespace identifiers (ns_sid's), a peer identifier typically contains only one secure peer identifier representing one shared folder. Alternatively, a peer identifier may contain a list of secure peer identifiers representing multiple shared folders.

The secure peer identifier can be a MAC generated by using, for example, a PRF such as HMAC-SHA-256 truncated to the least significant 64 bits. Generation of the secure peer identifier using a PRF may take ns_key, protocol_version, expire_time, nonce, etc. as input values. Since every announcement message can have a unique expiration time and/or nonce values, the resulting peer_sid can also be uniquely associated with that announcement message. In other words, there may be only one peer_sid that can be generated in response to an announcement message. This feature can help prevent replay attacks from malicious actors. Some of the input values such as protocol_version, expire_time, and nonce, can be serialized using a suitable data serialization method such as XML, JSON, etc. before going through a PRF encryption.

Figure 9:
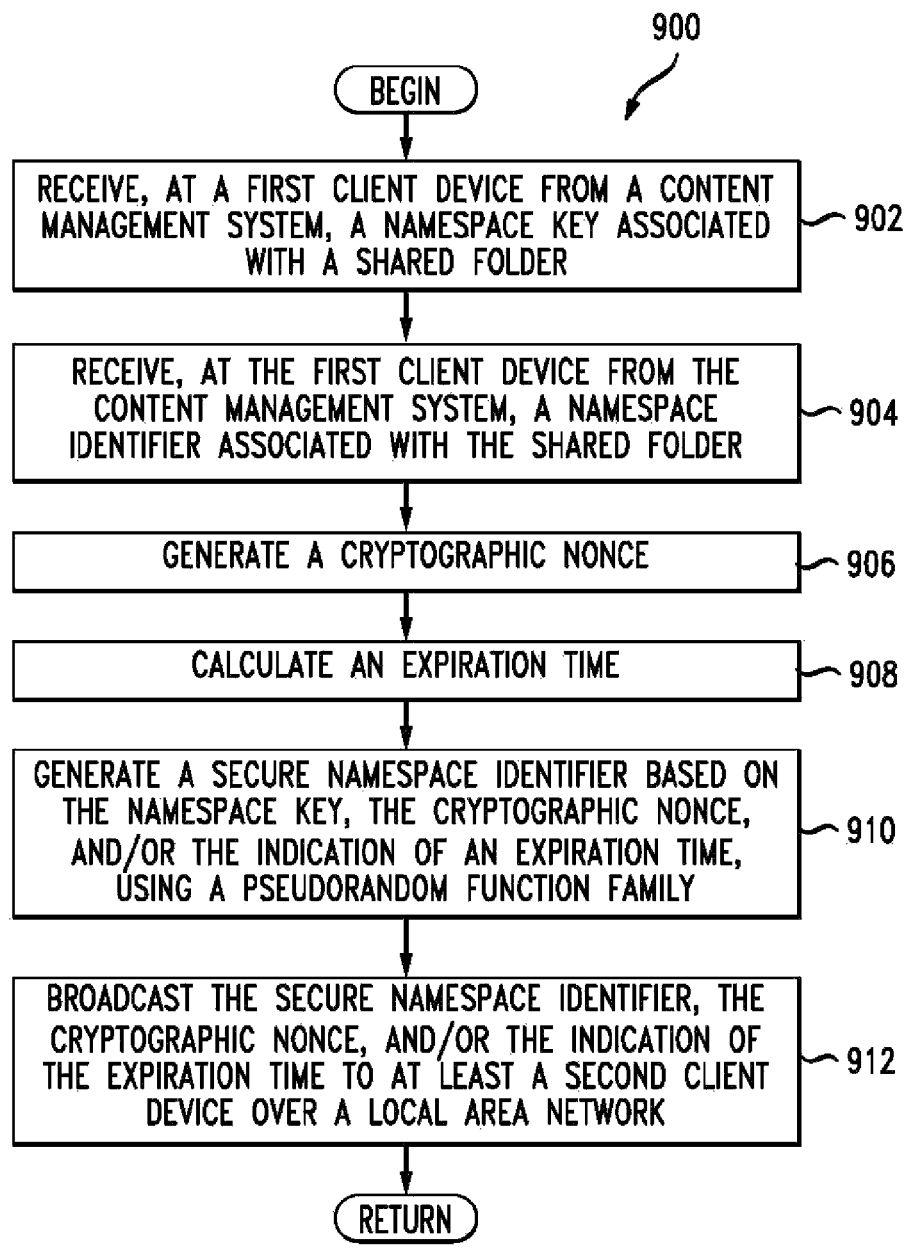
FIG. 9 shows the first exemplary method embodiment.

Having disclosed some basic system components and concepts, the disclosure now turns to the first exemplary method embodiment shown in FIG. 9. For the sake of clarity, the exemplary methods of FIGS. 9-12 are described in terms of an exemplary system 100 as shown in FIG. 1, configured to practice the method. The method steps are exemplary and can be implemented in any combination thereof, including combinations that exclude, add, or modify certain steps.

In this exemplary method of FIG. 9, system 100 receives, at a first client device from a content management system, a namespace key associated with a shared folder (902). The first client device may be part of a local area network. The first client system may host an instance of the shared folder, which can be synchronized with other client devices or the content management system. The shared folder may be associated with a namespace key, which can be a shared secret key between the content management system and the client device. The namespace key can be a secret string. As an example, user Alison may have a user account with a content management system such as Dropbox® from Dropbox Inc. of San Francisco, Calif. Alison creates a folder named "My Shared Photos" on her laptop computer and shares the folder on the content management system. The contents of the shared folder will be synchronized with the content management system and/or any other client devices that she may have associated with her user account and downloaded the shared folder to. Her laptop computer may receive a 64-bit hexadecimal namespace key that is associated with the "My Shared Photos" folder. The namespace key can be a string of code used to authenticate the laptop computer as a legitimate client device with access to the "My Shared Photos" folder.

System 100 may receive, at the first client device from the content management system, a namespace identifier associated with the shared folder (904). The namespace identifier can uniquely identify the associated shared folder and can be used to access, reference, manage, and manipulate the folder. The namespace identifier can be paired up with the namespace key and stored in the first client device. The first client device may receive he namespace identifier at the same time it receives the accompanying namespace key, before it receives the namespace key, or after it receives the namespace key. As a continuing example, the content management system can send a namespace identifier to Alison's laptop computer to be uniquely paired up with the "My Shared Photos" folder's namespace key. Both the namespace identifier and the namespace key for the folder may be inaccessible to their user, Alison, and be used in a transparent manner.

System 100 can generate a cryptographic nonce (906). The first client device can generate the cryptographic nonce. The cryptographic nonce can be a randomly generated number, refreshed every time a new announcement message is to be broadcast. The nonce can be associated with an announcement message and stored in the first client device to be retrieved later for the purpose of authentication. For example, Alison's laptop computer can randomly generate a hex-encoded 128-bit nonce value, which could then be stored in the laptop along with the namespace identifier and the namespace key. System 100 can also calculate an expiration time (908) for an announcement message. The expiration time may represent the window of time, in which a synchronization request must be made by another client device in response to the announcement message. The expiration time can be based on a standard time given by a server such as the content management system.

System 100 may generate a secure namespace identifier based on the namespace key, the cryptographic nonce, and/or the indication of an expiration time, using a pseudorandom function family (910). The secure namespace identifier may be used to obscure the namespace key from the view of unauthorized users. The pseudorandom function family can map one set of input values to an output value, which may be unique to the set of input values. The secure namespace identifier may be generated using a different cryptosystem other than the pseudorandom function family. The secure namespace identifier may be generated on a per-folder basis. In other words, for a certain number of shared folders the same number of secure namespace identifiers may be generated. Although a namespace identifier can be one of the input values when generating a secure namespace identifier, it is not essential that it be included because the receiving client device may still be able to infer the namespace identifier from the corresponding namespace key, which is used as an input value for generating the secure namespace identifier. For example, Alison's laptop computer may have a default expiration period of 12 hours for announcement messages. Any synchronization requests sent to her laptop after the 12-hour period expires may be ignored.

System 100 may broadcast the secure namespace identifier, the cryptographic nonce, and/or the indication of the expiration time to at least a second client device over a local area network (912). The secure namespace identifier, the cryptographic nonce, the indication of the expiration time, and other data such as a protocol version, listening port number, etc. can be packaged into an announcement message before being sent. The contents of the announcement message can be serialized. If the client device broadcasting the announcement message has more than one shared folder to announce, then the announcement message can include a serialized list of multiple secure namespace identifiers. The cryptographic nonce and the expiration time can be sent unencrypted in plaintext. The broadcast message can be sent to the second client device and/or any other client devices that may exist on the same local area network. The local area network may offer better performance than a wide area network that it connects to, so that it would be more advantageous for the attached client devices to synchronize data over the LAN rather than the WAN. For example, Alison's laptop computer, in order to attempt a LAN synchronization of the "My Shared Photos" folder, may generate an announcement message. Such message may consist of the protocol version of the message (e.g., "11.38"), the TCP port number that will be used to monitor any incoming sync requests (e.g., "12416"), the expiration time for sync requests (e.g., "10-29-2006 14:00:00"), the cryptographic nonce (e.g., "49206c6f766520796f754d696e73756e"), and the list of secure namespace identifiers including the one for the "My Shared Photos" folder. The announcement message may be broadcast to other client devices on the same local area network as Alison's laptop computer. One of those other client devices may be her smartphone, which also hosts an instance of the "My Shared Photos" folder.

Figure 10:
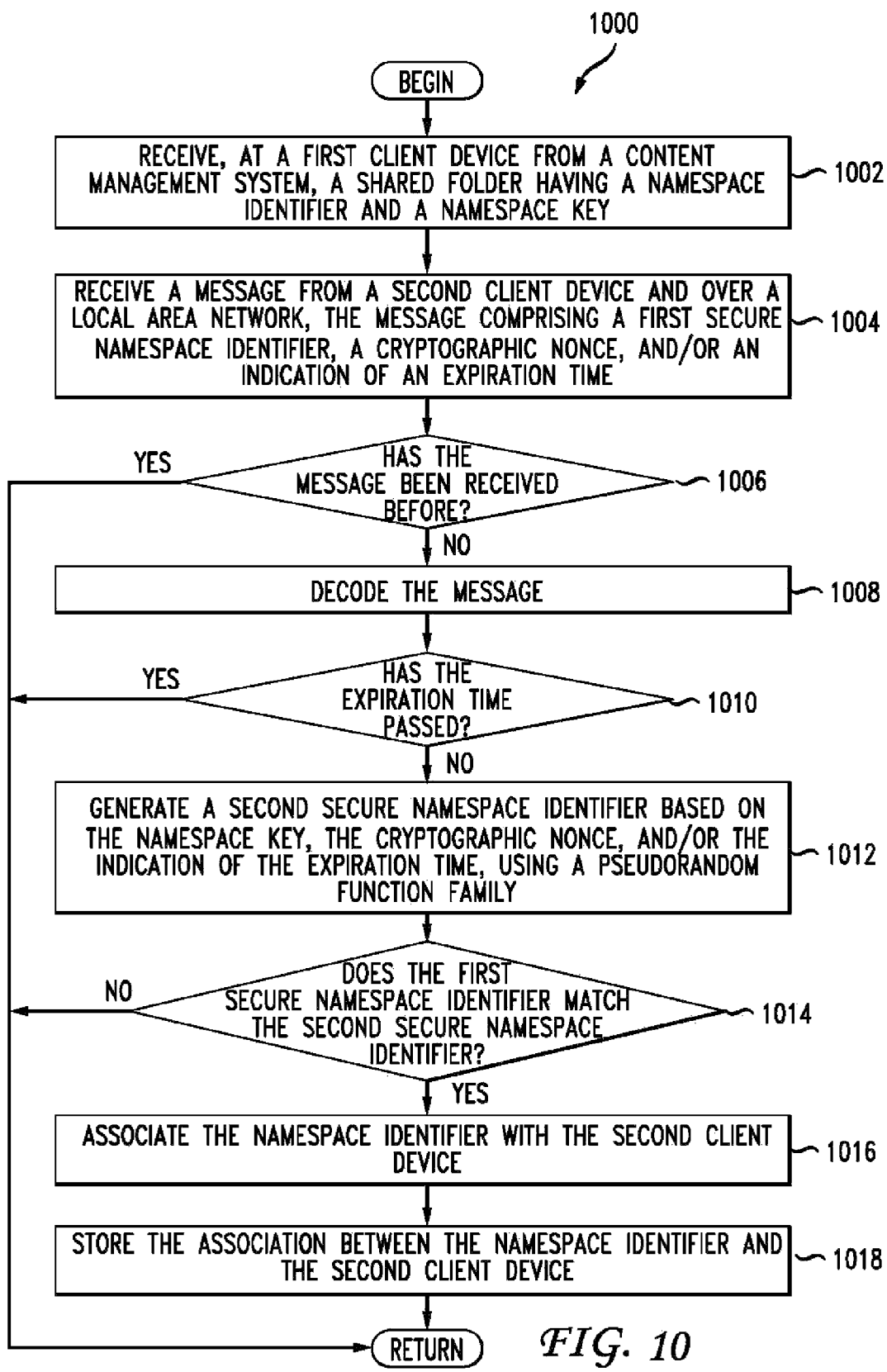
FIG. 10 shows the second exemplary method embodiment.

FIG. 10 shows the second exemplary method embodiment. System 100 may receive, at a first client device from a content management system, a shared folder having a namespace identifier and a namespace key (1002). As a continuing example from FIG. 9, the first client device can be Alison's smartphone, which has previously downloaded the "My Shared Photos" folder from the content management system. Since Alison's smartphone also has access to the folder, the content management system has distributed the associated namespace identifier and namespace key to the smartphone.

System 100 may receive a message from a second client device over a local area network, the message comprising a first secure namespace identifier, a cryptographic nonce, and/or an indication of an expiration time (1004). The message can be an announcement message that has been broadcast over the local area network to other client devices on the network including the first client device. The announcement message may contain other data as well such as the protocol version, the port number, etc. The cryptographic nonce and the indication of the expiration time can be in plaintext. For example, Alison's smartphone may receive an announcement message from her laptop computer. Both her laptop and her smartphone are wirelessly connected to her home Wi-Fi network. The announcement message sent by the laptop may contain the protocol version of the message (e.g., "11.38"), the TCP port number that must be used when sending a sync request (e.g., "12416"), the expiration time for sync requests (e.g., "10-29-2006 14:00:00"), the cryptographic nonce (e.g., "49206c6f766520796f754d696e73756e"), and the list of secure namespace identifiers associated with the available shared folders including the "My Shared Photos" folder.

System 100 may then determine whether an identical message to the one that was just received has been received before (1006). Such a determination may be made in order to cut down on duplicative computation work and avoid incurring unnecessary processing cost. Determining identity of the messages can be done by calculating and comparing hash values of the messages. Alternatively, the two messages can be compared bit-by-bit. The two messages can also be compared by comparing their nonce values. The first client device may have to record and keep track of all the announcement messages that it receives in order to make such determinations. If the received announcement message is identical to any of the previously received messages, the first client device can safely ignore the latest message. However, if the received message is a new message never been received before, system 100 may continue to process the message.

System 100 can decode the message (1008). Decoding the announcement message may simply entail parsing the individual data fields from the message. For example, individual data entries such as the protocol number, the expiration time, the nonce, etc. can be extracted from the message and stored as separate data objects. System 100 can also determine whether the expiration time has passed (1010). An announcement message past its expiration time may be useless to the receiving client device because it is already too late to respond to it with a synchronization request. Therefore, an expired message can be ignored by the first client device. For example, Alison's smartphone may indicate that according to its internal clock, synchronized with the content management system's standard time, the current time is "10-29-2006 05:57:21." Since it is not yet past the expiration time indicated in the announcement message (i.e., "10-29-2006 14:00:00"), the smartphone may continue to process the message.

System 100 may generate a second secure namespace identifier based on the namespace key, the cryptographic nonce, and/or the indication of the expiration time, using a pseudorandom function family (1012). In order to determine which shared folders are available for synchronization on the second client device, the first client device may calculate its own set of secure namespace identifiers. The first client device can generate its own secure namespace identifiers using the identical cryptographic methods and the identical input values as the second client device did. The client devices may agree upon such methods in advance. For instance, the protocol version may dictate the cryptographic method, the input values, and the format, etc. to be used by the two or more client devices. The second client device may supply some input values through the announcement message, such as the cryptographic nonce and the expiration time. If the first client device has more than one shared folder, the device may calculate secure namespace identifiers for all of its shared folders using their respective namespace keys. As a continuing illustration, Alison's smartphone may generate secure namespace identifiers based on the namespace keys corresponding to the shared folders hosted on the smartphone. The secure namespace identifiers may also be generated based on the cryptographic nonce and the expiration time that the smartphone received from the laptop via the announcement message. The secure namespace identifiers can also be generated based on the protocol version. Since "My Shared Photos" is one of the shared folders being hosted on the smartphone, one of those secure namespace identifiers generated by the smartphone would be identical to one of the secure namespace identifiers that were included in the announcement message.

System 100 may then determine whether the first secure namespace identifier matches the second secure namespace identifier (1014). The first client device may compare the secure namespace identifier that it generated with the secure namespace identifier that it received from the second client device via the announcement message. If the two identifiers match (i.e., they are identical) the first client device can make the determination that the second client device also hosts an instance of the same shared folder. The first client device may compare every one of the received secure namespace identifiers against each and every one of the generated secure namespace identifiers to ensure that all the matching pairs, each corresponding to a folder shared in common, are found. For example, Alison's smartphone may compare the secure namespace identifiers that it generated based on its namespace keys including the one corresponding to the "My Shared Photos" folder with the secure namespace identifiers that it received from the Laptop computer. Once the smartphone finds a match for the "My Shared Photos" folder, the smartphone can determine that the "My Shared Photos" folder is available on the laptop for synchronization, because without the corresponding shared secret key (i.e., namespace key), which would have only been given out to a client device with proper access privilege, the laptop computer could not have generated the matching secure namespace identifier.

If there is no match between the two sets of secure namespace identifiers, the first client device may stop processing the message any further. However, if the first secure namespace and the second secure identifier match, system 100 may associate the corresponding namespace identifier with the second client device (1016). The first client device can find the corresponding namespace identifier by looking up its corresponding namespace key. System 100 may also store the association between the namespace identifier and the second client device (1018). Additionally, other related information may also be stored, such as the namespace key, the expiration time, the cryptographic nonce, the peer identifier, etc. Such information may be later referenced when sending out a synchronization request to the second client device.

Figure 11:
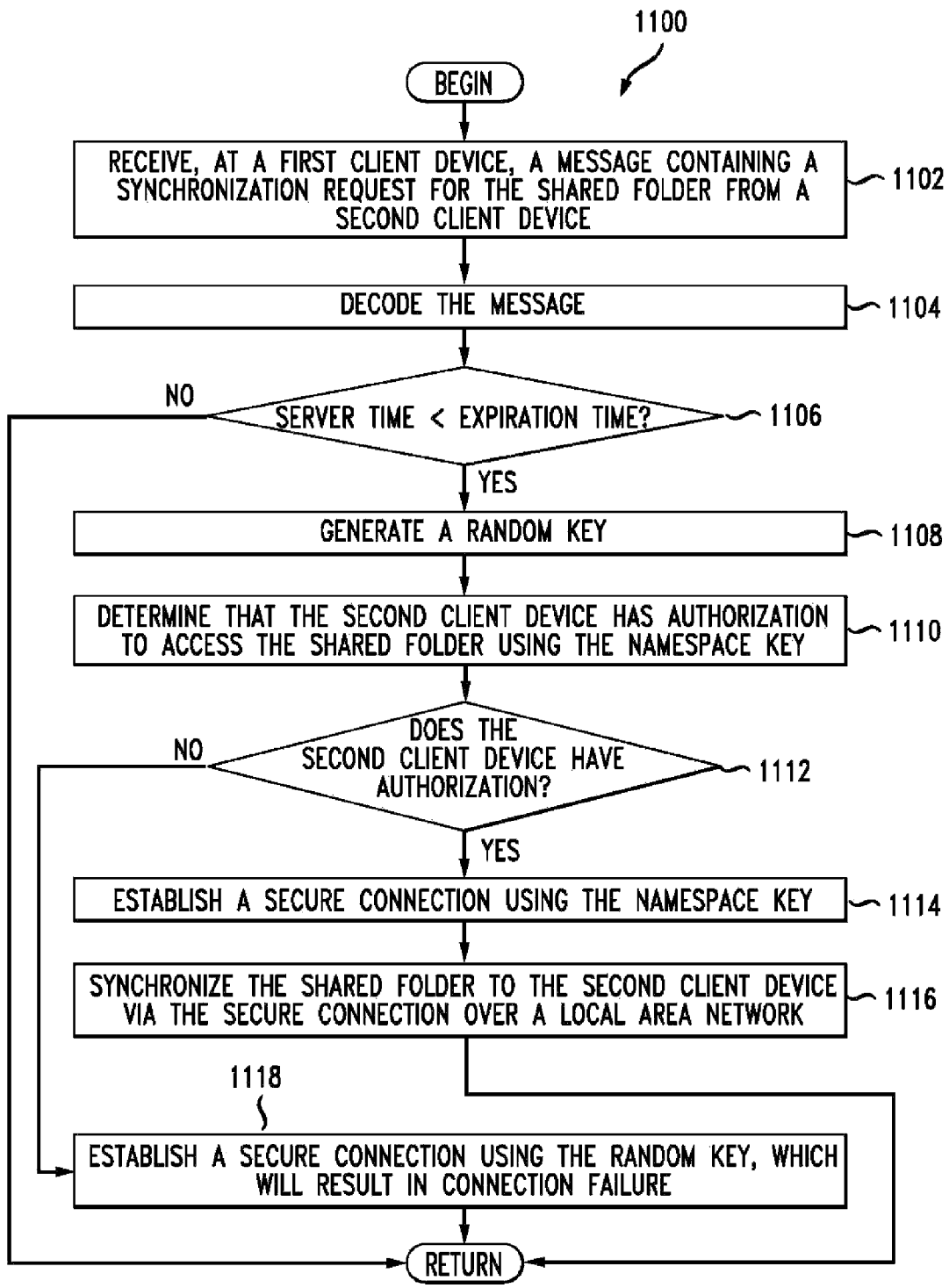
FIG. 11 shows the third exemplary method embodiment.

FIG. 11 shows the third exemplary method embodiment. System 100 may receive, at a first client device, a message containing a synchronization request for a shared folder from a second client device (1102). The first client device may host an instance of the shared folder. Further, the second client device may have already established through the receipt of an announcement message from the first client device, that both the first client device and the second client device host instances of the shared folder. Thus, the message containing the synchronization request may have been sent in response to the announcement message previously sent by the first client device. The message can be in a form of a request to establish a secure connection such as a TLS-PSK connection. Furthermore, the message can be sent over a local area network, on which both the first client device and the second client device are present.

The message may include a peer identifier, which in turn may consist of a protocol version, an expiration time, a cryptographic nonce, a secure peer identifier, etc. The peer identifier may use a different protocol version than the protocol version used by the announcement message. For example, announcement messages may be generated using protocol version 10.29, while the peer identifiers can be generated using protocol version 4.16. Using different numbers for the protocol versions in the announcement message and the synchronization request can discourage replay attacks because it makes it more difficult to repurpose the secure namespace identifier, which incorporates one version number, as a secure peer identifier, which is expected to incorporate another version number. The expiration time and the nonce, however, can be identical to those that have been provided by the announcement message. The secure peer identifier may be generated using a PRF based on such input values as the namespace key associated with the shared folder, the protocol version for the sync request message, the expiration time, and the nonce. In a continuing example, it may be advantageous for Alison's smartphone to synchronize the "My Shared Photos" folders with her laptop computer over the home Wi-Fi network instead of syncing with the content management system. The laptop may receive a sync request message from Alison's smartphone over the Wi-Fi network. The smartphone may attempt to establish a TLS-PSK connection to the laptop using peer_id as the smartphone's PSK identity.

The system 100 can then decode the message (1104). The first client device may parse the request message and separate out the individual data elements such as the protocol version, the expiration time, the cryptographic nonce, the secure peer identifier, etc. The system 100 may also determine whether the expiration time has passed (1106). If the current time is past the expiration time, the request may be rejected. For example, Alison's laptop may have received the smartphone's sync request message at "10-29-2006 06:22:09." Since the expiration time (i.e., "10-29-2006 14:00:00") is not passed, the laptop continues to process the request message.

If the expiration time is not passed, system 100 can generate a random key (1108). The random key can be a bogus key that is not capable of establishing a secure connection between the first client device and the second client device. This key can be used by the first client device to reject the second client device's sync request while preventing a potential timing attack by an unauthorized eavesdropper.

Next, system 100 may determine that the second client device has authorization to access the shared folder, using the namespace key (1110). The first client device may determine this by generating its own set of secure peer identifiers based on the namespace keys for all the shared folders the first client device has access to. The generated secure peer identifiers are compared against the secure peer identifier received by the second client device via the request message. If it is determined that the second client device has proper authorization, system 100 continues to process the request (1112). If not, however, the request may be dropped. Alternatively, system 100 may establish a secure connection using the random key, which will result in connection failure (1118). For example, Alison's laptop may generate secure peer identifiers using namespace keys for all of its shared folders including the "My Shared Photos" folder. The laptop may compare all of its secure peer identifiers against the secure peer identifier received from the smartphone and find a match. The laptop now knows that the smartphone also has authorization to access the "My Shared Photos," because the smartphone could not have generated the matching secure peer identifier without the namespace key that corresponds to the folder.

System 100 may now establish a secure connection using the namespace key (1114). The first client device may establish a secure connection such as a TLS-PSK connection with the second client device. The namespace key for the shared folder to be synchronized may be used as the shared secret key for the establishment of the secure connection. Alternatively, the secure connection may be established using the secure peer identifier. System 100 can now synchronize the shared folder to the second client device via the secure connection over a local area network (1116). For example, Alison's laptop may establish a TLS-PSK connection with the smartphone using the "My Shared Photos" folder's namespace key as the shared secret key. Via the secure connection over the Wi-Fi network, the two devices may synchronize the "My Shared Photos" folder. The synchronization may occur either one way or both ways.

Figure 12:
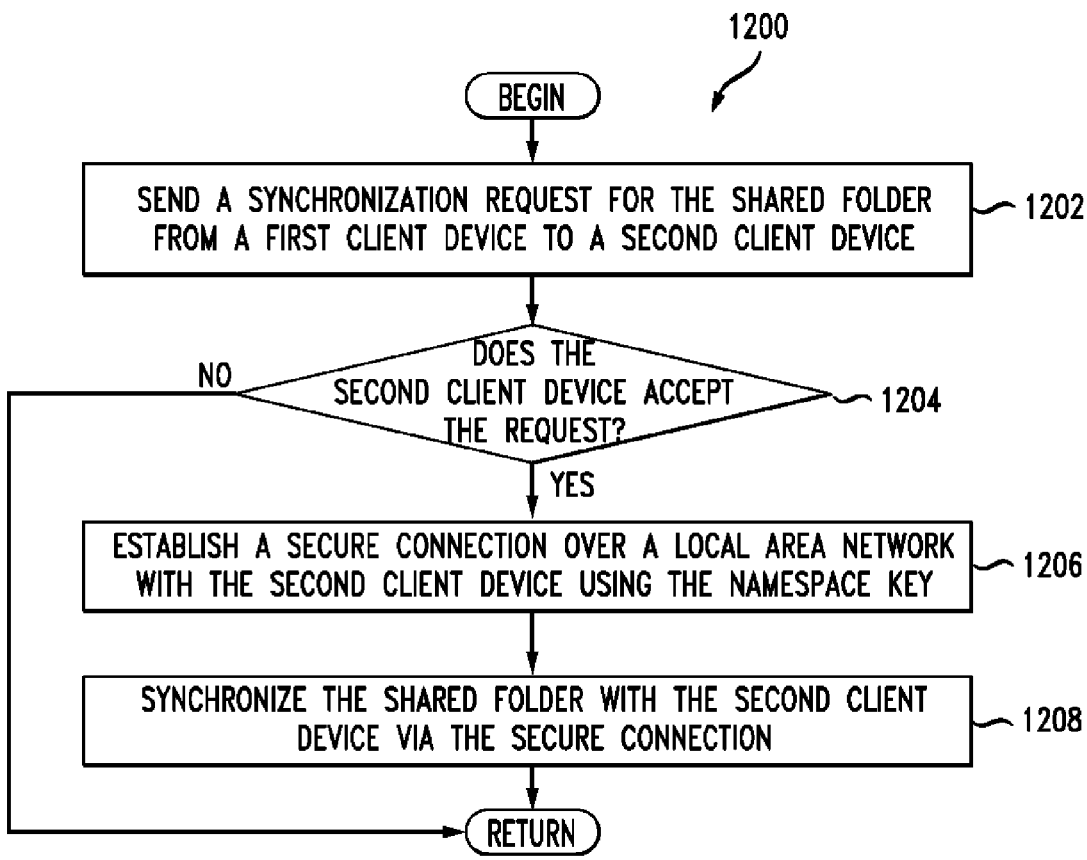
FIG. 12 shows the fourth exemplary method embodiment.

FIG. 12 shows the fourth exemplary method embodiment. System 100 may send a synchronization request for a shared folder from a first client device to a second client device (1202). The synchronization request can be based on an announcement message previously broadcast at least to the first client device by the second client device. The first client device and the second client device may both host instances of the shared folder. The synchronization request can be part of a secure connection such as a TLS-PSK connection. Further, the synchronization request may consist of a peer identifier, which in turn may include a protocol version, an expiration time, a cryptographic nonce, and a secure peer identifier. The secure peer identifier may be generated with a PRF using such input values as a namespace key and a serialized list of a protocol version, an expiration time, and a cryptographic nonce. As a continuing illustration, Alison's smartphone may send a synchronization request to her laptop for the folder named "My Shared Photos."

System 100 may determine whether the second client device accepts the request (1204). The first client device may know that the second client device has rejected the request if the secure connection is not successfully established. Alternatively, the first client device may receive a rejection message from the second client device. If the request is not accepted, system 100 may not be able to synchronize the shared folder. However, if the request is accepted, then system 100 can establish a secure connection over a local area network with the second client device using the namespace key (1206). The secure connection, such as a TLS-PSK connection, may be established between the first client device and the second client device. Alternatively, the secure connection can be established using a secure peer identifier corresponding to the shared folder, instead of using the namespace key. Once the secure connection is established, system 100 may synchronize the shared folder with the second client device via the secure connection (1208).

Figure 13A:
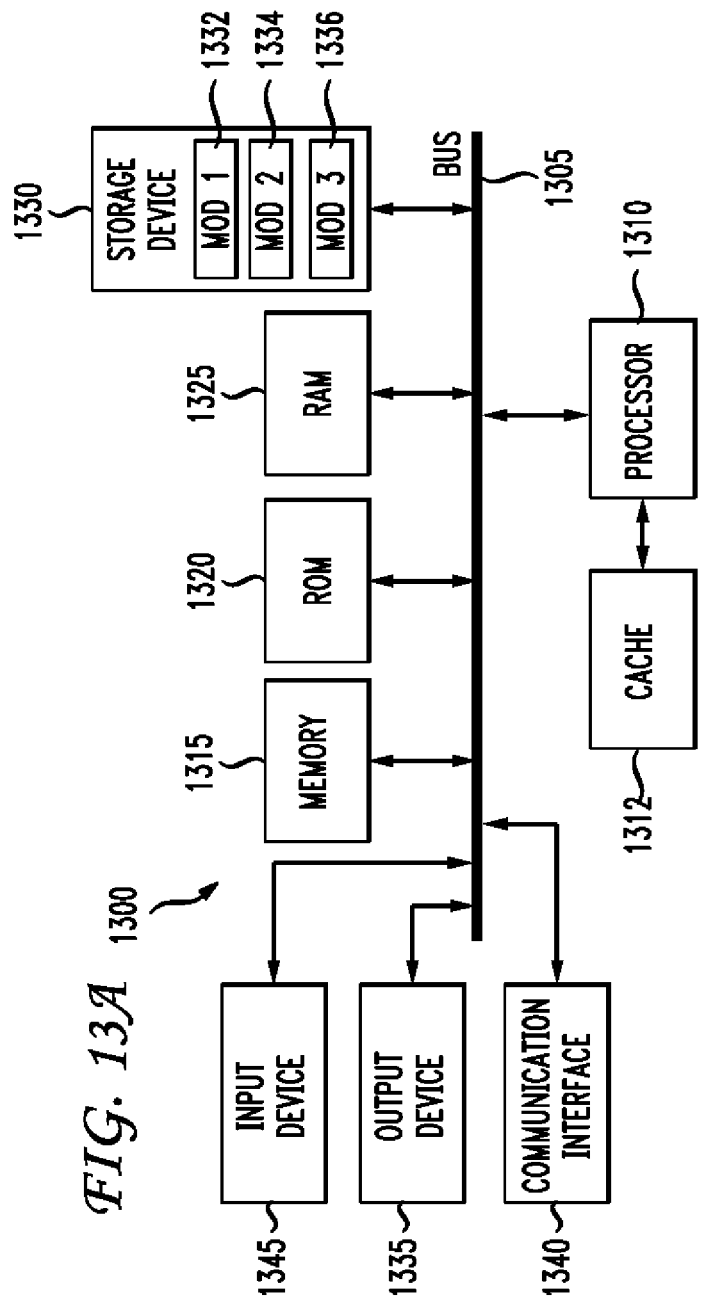
FIG. 13A shows the first exemplary system embodiment for implementing various embodiments of the present technology.
Figure 13B:
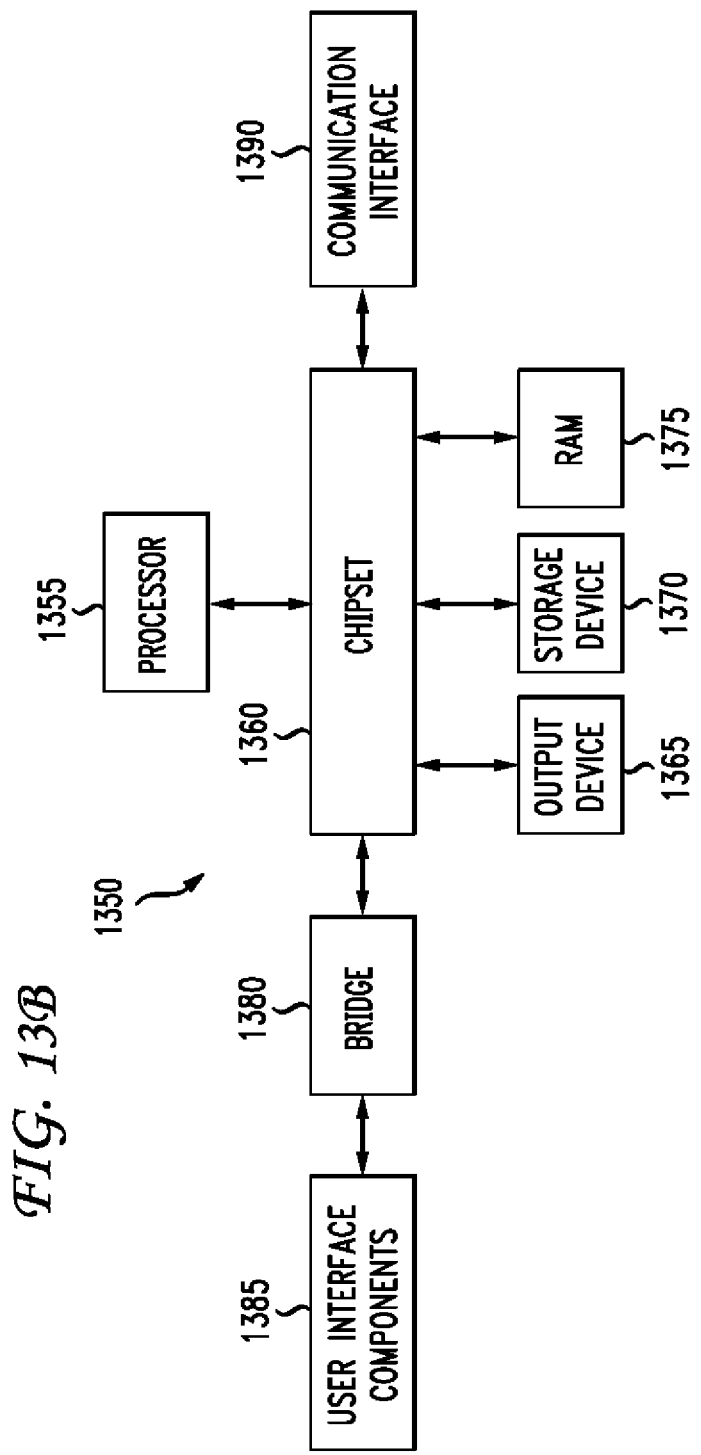
FIG. 13B shows the second exemplary possible system embodiment for implementing various embodiments of the present technology.

FIG. 13A and FIG. 13B show exemplary possible system embodiments. The more appropriate embodiment will be apparent to those of ordinary skill in the art when practicing the present technology. Persons of ordinary skill in the art will also readily appreciate that other system embodiments are possible.

FIG. 13A illustrates a conventional system bus computing system architecture 1300 wherein the components of the system are in electrical communication with each other using a bus 1305. Exemplary system 1300 includes a processing unit (CPU or processor) 1310 and a system bus 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware module or software module, such as module 1 1332, module 2 1334, and module 3 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer-readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include software modules 1332, 1334, 1336 for controlling the processor 1310. Other hardware or software modules are contemplated. The storage device 1330 can be connected to the system bus 1305. In one aspect, a hardware module that performs a particular function can include the software component stored in a computer-readable medium in connection with the necessary hardware components, such as the processor 1310, bus 1305, display 1335, and so forth, to carry out the function.

FIG. 13B illustrates a computer system 1350 having a chipset architecture that can be used in executing the described method and generating and displaying a graphical user interface (GUI). Computer system 1350 is an example of computer hardware, software, and firmware that can be used to implement the disclosed technology. System 1350 can include a processor 1355, representative of any number of physically and/or logically distinct resources capable of executing software, firmware, and hardware configured to perform identified computations. Processor 1355 can communicate with a chipset 1360 that can control input to and output from processor 1355. In this example, chipset 1360 outputs information to output 1365, such as a display, and can read and write information to storage device 1370, which can include magnetic media, and solid state media, for example. Chipset 1360 can also read data from and write data to RAM 1375. A bridge 1380 for interfacing with a variety of user interface components 1385 can be provided for interfacing with chipset 1360. Such user interface components 1385 can include a keyboard, a microphone, touch detection and processing circuitry, a pointing device, such as a mouse, and so on. In general, inputs to system 1350 can come from any of a variety of sources, machine generated and/or human generated.

Chipset 1360 can also interface with one or more communication interfaces 1390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1355 analyzing data stored in storage 1370 or 1375. Further, the machine can receive inputs from a user via user interface components 1385 and execute appropriate functions, such as browsing functions by interpreting these inputs using processor 1355.

It can be appreciated that exemplary systems 1300 and 1350 can have more than one processor 1310 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at a first application associated with a content management system on a first client device and a second application associated with the content management system on at least one second client device, from the content management system, a shared secret key generated at the content management system for a shared folder and a corresponding namespace identifier;
generating, via at least one processor of the first client device, a secure identifier based on the shared secret key and namespace identifier and further based on a cryptographic nonce that is uniquely generated for an announcement message;
broadcasting, by the first application associated with the content management system on the first client device, the announcement message comprising the secure identifier and the cryptographic nonce to the second application associated with the content management system on the at least one second client device;
receiving the announcement message at the second application associated with the content management system on the at least one second client device;
determining, based on the received announcement message, that the shared folder is associated with the at least one second client device based on the generated secure identifier,
establishing a connection over a local area network between the first application associated with the content management system on the first client device and the second application associated with the content management system on the at least one second client device; and
synchronizing at least one content item in the shared folder between the first client device and the at least one second client device over the connection.

2. The computer-implemented method of claim 1, further comprising receiving, at the first client device from the content management system, a folder identifier associated with the shared folder.

3. The computer-implemented method of claim 1, wherein the secure identifier is generated using a pseudorandom function family.

4. The computer-implemented method of claim 1, wherein the secure identifier is broadcast over the local area network.

5. The computer-implemented method of claim 1, wherein the shared secret key comprises a secret string.

6. The computer-implemented method of claim 1, wherein the cryptographic nonce is periodically renewed and never repeated.

7. The computer-implemented method of claim 1, wherein generating the secure identifier is further based on an indication of an expiration time, and the method further comprising:
broadcasting the indication to at least the at least one second client device.

8. The computer-implemented method of claim 1, further comprising:
receiving a synchronization request for the shared folder from the at least one second client device; and in response to determining that the at least one second client device has authorization to access the shared folder using the shared secret key, synchronizing the shared folder to the second client device over the local area network.

9. A non-transitory computer-readable medium storing computer executable instructions for causing a computer to perform a method comprising:
receiving, at first application associated with a content management system on a first client device and a second application associated with the content management system on at least one second client device, from the content management system, a shared folder having a folder identifier and a shared secret key generated at the content management system for the shared folder;
receiving, at the first application associated with the content management system on the first client device, a first secure identifier associated with the shared folder from the second application associated with the content management system on the at least one second client device;
generating, at the first application associated with the content management system on first client device, a second secure identifier associated with the shared folder based on the shared secret key; and
when the first secure identifier matches the second secure identifier, associating the folder identifier with the at least one second client device;
establishing a connection over a local area network between the first application associated with the content management system on the first client device and the second application associated with the content management system on the at least one second client device; and
synchronizing at least one content item in the shared folder between the first client device and the at least one second client device over the connection.

10. The non-transitory computer-readable medium of claim 9, wherein the second secure identifier is generated using a pseudorandom function family.

11. The non-transitory computer-readable medium of claim 9, wherein the first secure identifier is received over the local area network.

12. The non-transitory computer-readable medium of claim 9, wherein associating the folder identifier with the at least one second client device yields an association, the method further comprising storing the association.

13. The non-transitory computer-readable medium of claim 9, wherein generating the second secure identifier is further based on an expiration time received from the at least one second client device, and wherein the folder identifier is associated with the at least one second client device only when the expiration time has not passed.

14. The non-transitory computer-readable medium of claim 9, wherein the second secure identifier is generated further based on a cryptographic nonce received from the second application associated with the content management system on the at least one second client device.

15. The non-transitory computer-readable medium of claim 9, wherein the method further comprises:
sending a synchronization request for the shared folder to the at least one second client device;
establishing a secure connection over the local area network with the at least one second client device using the shared secret key; and
synchronizing the shared folder with the at least one second client device via the secure connection.

16. A manufacture comprising:
a non-transitory computer-readable medium; and
computer-readable instructions, stored on the non-transitory computer-readable medium, that when executed are effective to cause an application associated with a content management system on a computer to:
generate, at a first application associated with the content management system on a first client device, a secure identifier for a shared folder, based on a shared secret key generated at the content management system for the shared folder and further based on a cryptographic nonce that is uniquely generated for an announcement message;
broadcast by the first application associated with the content management system on the first client device the secure identifier to a second application associated with the content management system on at least one second client device using the announcement message;
receive a synchronization request for the shared folder from the second application associated with the content management system on the at least one second client device;
establish a connection over a local area network between the first application associated with the content management system on the first client device and the second application associated with the content management system on the at least one second client device; and
in response to authenticating, using the shared secret key, that the second client device has authorization to access the shared folder, synchronize the shared folder with the second client device over the local area network.

17. The manufacture of claim 16, wherein the shared folder is also synchronized on the content management system, and wherein the first client device and the at least one second client device are associated with the content management system.

18. The manufacture of claim 16, wherein the computer-readable instructions are effective to further cause the computer to announce the secure identifier to a plurality of client devices over the local area network.

19. The manufacture of claim 16, wherein the computer-readable instructions are effective to further cause the computer to authenticate, using the shared secret key, the second client device for access to the shared folder.

20. The manufacture of claim 16, wherein generating the secure identifier is further based on an indication of an expiration time.

\* \* \* \* \*